(12) United States Patent
Kamen et al.

(10) Patent No.: US 8,714,925 B2
(45) Date of Patent: May 6, 2014

(54) CENTRIFUGALLY DRIVEN AERODYNAMIC ROTOR BLADE BRAKE ASSEMBLY

(75) Inventors: Dean Kamen, Bedford, NH (US); Christopher C. Langenfeld, Nashua, NH (US); Stanley B. Smith, III, Raymond, NH (US); Christopher M. Werner, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 724 days.

(21) Appl. No.: 12/784,163

(22) Filed: May 20, 2010

(65) Prior Publication Data

US 2010/0296935 A1    Nov. 25, 2010

Related U.S. Application Data

(60) Provisional application No. 61/179,890, filed on May 20, 2009.

(51) Int. Cl.
F03D 7/04 (2006.01)

(52) U.S. Cl.
USPC ............... 416/23; 416/41; 416/44; 416/139; 416/169 R

(58) Field of Classification Search
USPC ........... 416/12, 13, 16, 23, 24, 41, 43, 44, 45, 416/139, 169 R; 200/6 R, 7, 80 R, 80 B; 244/99.2, 99.3, 123.1, 123.8, 201, 213
See application file for complete search history.

(56) References Cited

U.S. PATENT DOCUMENTS 4,180,372 A   12/1979  Lippert
4,557,666 A   12/1985  Baskin et al.
(Continued)

FOREIGN PATENT DOCUMENTS

WO    WO 2004/099608    11/2004

OTHER PUBLICATIONS

Miller et al (Journal of Solar Energy Engineering, vol. 118, Nov. 1996, pp. 198-203).*

(Continued)

Primary Examiner — Edward Look
Assistant Examiner — Juan G Flores
(74) Attorney, Agent, or Firm — Marc J. Gorayeb

(57) ABSTRACT

An aerodynamic brake assembly for use with an airfoil such as the blade of a wind turbine rotor comprises deployable upper and/or lower spoiler plates incorporated in or attached to the airfoil. The spoiler plates can deploy under the influence of centrifugal forces when the rotating airfoil or rotor blade reaches a pre-determined rotational speed. The aerodynamic brake assembly may be integrated within the airfoil or attached to the tip of the airfoil such that, when not deployed, the upper and lower spoiler plates have a profile that approximately conforms to the profile of the part of the airfoil to which it the brake assembly is attached. Thus in a non-deployed state, the spoiler plates have a non-detrimental effect on the performance of the airfoil, and may even contribute to its aerodynamic lift properties. A weighted arm linked to the spoiler plate mechanism can be held in position electromagnetically or by solenoid, until an electrical signal from a controller causes it to release, leading to deployment of the spoiler plates. Failsafe deployment of the spoiler plates can occur either upon loss of power to the mechanism, or when the centrifugal force associated with an overspeed condition of the rotor overcomes the holding force of the electromagnet or solenoid.

20 Claims, 32 Drawing Sheets

(56) References Cited

U.S. PATENT DOCUMENTS

| | | | |
|---|---|---|---|
| 4,670,631 A * | 6/1987 | Peachee et al. | 200/80 R |
| 4,952,119 A | 8/1990 | Widseth | |
| 6,010,097 A | 1/2000 | Cox | |
| 6,929,450 B2 | 8/2005 | Noble | |
| 7,338,018 B2 | 3/2008 | Huynh et al. | |
| 8,123,488 B2 * | 2/2012 | Finnigan et al. | 416/226 |
| 2008/0075594 A1 | 3/2008 | Bailey et al. | |

OTHER PUBLICATIONS

Miller et al.: *"An Evaluation of Several Wind Turbine Trailing-Edge Aerodynamic Brakes"* Jornal of Solar Energy Engineering, ASME International, US, vol. 118, No. 4, Nov. 1, 1996 pp. 198-203, XP008121575.

International Partial Search Report dated Mar. 25, 2011, received in international patent application No. PCT/US2010/035613, 7 pgs.

International Search Report and Written Opinion dated Sep. 6, 2011, received in international patent application No. PCT/US2010/035613, 15 pgs.

International Preliminary Report on Patentability and Written Opinion dated Dec. 1, 2011, received in international patent application No. PCT/US2010/035613, 9 pgs.

* cited by examiner

CENTRIFUGALLY DRIVEN AERODYNAMIC ROTOR BLADE BRAKE ASSEMBLY

RELATED APPLICATIONS

This application claims priority from U.S. Provisional Patent Application No. 61/179,890 filed May 20, 2009, and entitled Centrifugally Driven Aerodynamic Rotor Blade Brake Assembly, which is incorporated by reference herein in its entirety.

FIELD OF THE INVENTION

The present invention relates generally to aerodynamic brake assemblies for airfoils, and in one embodiment to aerodynamic brake assemblies for wind turbine rotor blades.

SUMMARY

The aerodynamic brake assembly is for use generally with an airfoil, or for example with a wind turbine rotor blade, comprising deployable upper and/or lower spoiler plates incorporated in or attached to the airfoil or rotor blade. The spoiler plates can be deployed under the influence of centrifugal forces when the airfoil reaches a specified rotational speed. The aerodynamic brake assembly may be integrated within the airfoil or appended to the tip of the airfoil such that, when not deployed, the upper and lower spoiler plates have a profile that approximately conforms to the profile of the part of the airfoil to which it the brake assembly is attached, or the part of the airfoil within which it is incorporated. Thus, in a non-deployed state, the spoiler plates do not impair the performance of the airfoil, and may actually contribute to the aerodynamic lift properties of the airfoil. The aerodynamic brake assembly may thus reduce or eliminate parasitic drag, in contrast with other airfoil-mounted brake configurations. In an embodiment, the deployment mechanism is capable of actuating the upper and lower spoiler plates by responding to centrifugal forces resulting from the rotational movement of an airfoil attached at one end to a rotating hub (as in, for example, a wind turbine rotor). A weighted arm, disposed within the interior portion of the aerodynamic brake assembly and pivotably joined to one or more spoiler plate linkages, may rotate in response to such centrifugal forces and actuate the linkages, thereby deploying the upper and lower spoiler plates and reducing the rotational speed of the airfoil. The rotational movement of the weighted arm is converted to a reciprocating fore and aft motion of a link arm that connects the weighted arm to the spoiler plate linkages. In the case of a wind turbine rotor, deployment of the spoiler plates may be prevented by electrical power supplied to a solenoid providing an electromagnetic force on a component of the weighted arm to prevent movement of the weighted arm below a specified threshold level of centrifugal force. This configuration facilitates deployment of the spoiler plates upon a controller-mediated detection of certain conditions (such as, for example, airfoil speed, wind speed and/or direction, or mechanical factors related to the airfoil or an associated wind-driven turbine), and can provide fail-safe features, such as deployment of the spoiler plates upon loss of power to certain components of the airfoil or an associated wind-driven turbine, or upon airfoil rotation exceeding a threshold level. Such features may prolong the mechanical lifespan of the airfoil, an associated wind-driven turbine, its components and the aerodynamic brake assembly itself, and increase the safety of a device incorporating the aerodynamic brake assembly, such as a wind-driven turbine.

In one aspect the invention comprises a braking assembly for an airfoil, the airfoil configured to rotate about a hub, comprising a first plate and an opposing second plate, the plates having outside surfaces, opposing inside surfaces, and each having a forward portion with a leading edge and an aft portion with a trailing edge, such that the inside surface of the forward portion of each plate is hingedly connected to a frame, allowing the aft portions of the plates to pivot away from or retract toward each other; and the frame is attachable to a section of the airfoil such that the outside surfaces of the plates when retracted conform approximately to the contour of a section of the airfoil to which the braking assembly can be attached.

In another aspect, the braking assembly comprises a linkage assembly between the first and second plates; the linkage assembly hingedly interconnecting the forward portions of inside surfaces of the first and second plates to a first end of an elongate driving member configured to move fore and aft, such that forward movement of the driving member toward the leading edges of the plates causes the aft portions of the plates to retract toward each other, and aft movement of the driving member away from the leading edges of the plates causes the aft portions of the plates to pivot away from each other.

In another aspect, the braking assembly comprises an elongated spar having a proximal end and a distal end, situated in a space bounded by the inside surfaces of the retracted plates, the long axis of the spar oriented approximately perpendicular to the forward to aft direction of the plates, the braking assembly further comprising a weighted member having a first pivotal connection to the spar, the first pivotal connection having an axis of rotation approximately perpendicular to the surfaces of the retracted plates, a second pivotal connection to a second end of the driving member, the axis of rotation of the second pivotal connection being approximately parallel to and non-coincident with the axis of the first pivotal connection, such that rotation of the weighted member about the first pivotal connection causes a fore or aft movement of the driving member.

In another aspect, the center of mass of the weighted member is non-coincident with the axis of the first pivotal connection of the weighted member to the spar, such that centrifugal force acting generally from the proximal end toward the distal end of the spar can cause rotation of the weighted member about the first pivotal connection.

In a further aspect, the weighted member comprises an elongated arm such that the first pivotal connection is located near a first end of the arm, and a second end of the arm comprises an arm weight, the arm weight having a latching feature or a ferromagnetic component. The latching feature can reversibly couple with a latch connected to a plunger of a solenoid secured to the frame when the arm weight is in a retracted position proximal to the first pivotal connection of the arm. Electrical activation of the solenoid can place the latch in a position to couple with the arm weight. The solenoid plunger can further comprise a plunger weight, the characteristics of the plunger weight selected to overcome the electromagnetic pull on the plunger by the solenoid, upon the application of a pre-determined amount of centrifugal force acting on the plunger weight.

The ferromagnetic component can magnetically immobilize the weight next to a pole of an electromagnet secured to the frame when the arm weight is in a retracted position proximal to the first pivotal connection of the arm. The characteristics of the electromagnet can be selected to produce an electrically induced magnetic force attracting the ferromagnetic component of the arm weight that can be overcome by a pre-determined amount of centrifugal force acting on the arm weight.

In another aspect, the braking assembly can be controlled by an electronic controller that can be configured to receive a signal representing the rotational speed of the airfoil, and configured to interrupt electrical power to the solenoid or electromagnet upon the airfoil reaching a pre-determined rotational speed.

The braking assembly can further comprise an electrical switch responsive to a pre-determined centrifugal force, the switch being capable of interrupting electrical power to the solenoid in response to the centrifugal force. In another aspect a mechanism to operate the electrical switch can comprise a weighted actuator pivotally connected to the frame and capable of rotating into and out of contact with the switch, and a spring connecting the weighted actuator to the frame and applying a biasing force to urge the weighted actuator into contact with the switch. The center of mass of the weighted actuator is non-coincident with the axis of rotation of the weighted actuator, such that application of a pre-determined centrifugal force on the weighted actuator can overcome the biasing force of the spring to reduce the contact force of the weighted actuator against the switch. In a further aspect, the switch can be operated by a cable connecting the weighted member to an anchor pivotally connected to the frame, such that a pre-determined degree of travel by the weighted member causes the cable to move the anchor into contact with the weighted actuator and overcome the biasing force of the spring to reduce the contact force of the weighted actuator against the switch.

The braking assembly need not be comprised of two opposing plates. In some embodiments, a single spoiler plate can be sufficient to provide the necessary braking capacity. Thus the braking assembly can comprise:

a) a plate having an outside surface, inside surface, and having a forward portion with a leading edge and an aft portion with a trailing edge; the inside surface of the forward portion of the plate being hingedly connected to a frame, allowing the aft portion of the plate to pivot away from or retract toward the frame; the frame being attachable to a section of the airfoil such that the outside surface of the plate when retracted conforms approximately to the contour of a section of the airfoil to which the braking assembly can be attached;

b) a linkage assembly hingedly interconnecting the inside surface of the forward portion of the plate to a first end of an elongate driving member configured to move fore and aft; such that forward movement of the driving member toward the leading edge of the plate causes the aft portion of the plate to retract toward the frame, and aft movement of the driving member away from the leading edge of the plate causes the aft portion of the plate to pivot away from the frame;

c) a weighted member having a first pivotal connection to the frame, the first pivotal connection having an axis of rotation approximately perpendicular to the surface of the retracted plate, and a second pivotal connection to a second end of the driving member, the axis of rotation of the second pivotal connection being approximately parallel to and non-coincident with the axis of the first pivotal connection, such that rotation of the weighted member about the first pivotal connection causes a fore or aft movement of the driving member, and retraction or deployment of the plate.

The invention also includes an assembly for operating an electrical switch attached to a frame comprising: a weighted actuator pivotally connected to the frame and capable of rotating into and out of contact with the switch, and a spring connecting the weighted actuator to the frame and applying a biasing force to urge the weighted actuator to contact the switch. The center of mass of the weighted actuator is non-coincident with the axis of rotation of the weighted actuator, and application of a pre-determined centrifugal force on the weighted actuator overcomes the biasing force of the spring to reduce the contact force of the weighted actuator against the switch. In a further embodiment, the assembly includes a cable connected to an anchor pivotally connected to the frame, such that a pre-determined pulling force by the cable against the anchor can cause the anchor to contact the weighted actuator and overcome the biasing force of the spring to reduce the contact force of the weighted actuator against the switch.

DESCRIPTION OF THE PREFERRED EMBODIMENTS

Figure 1:
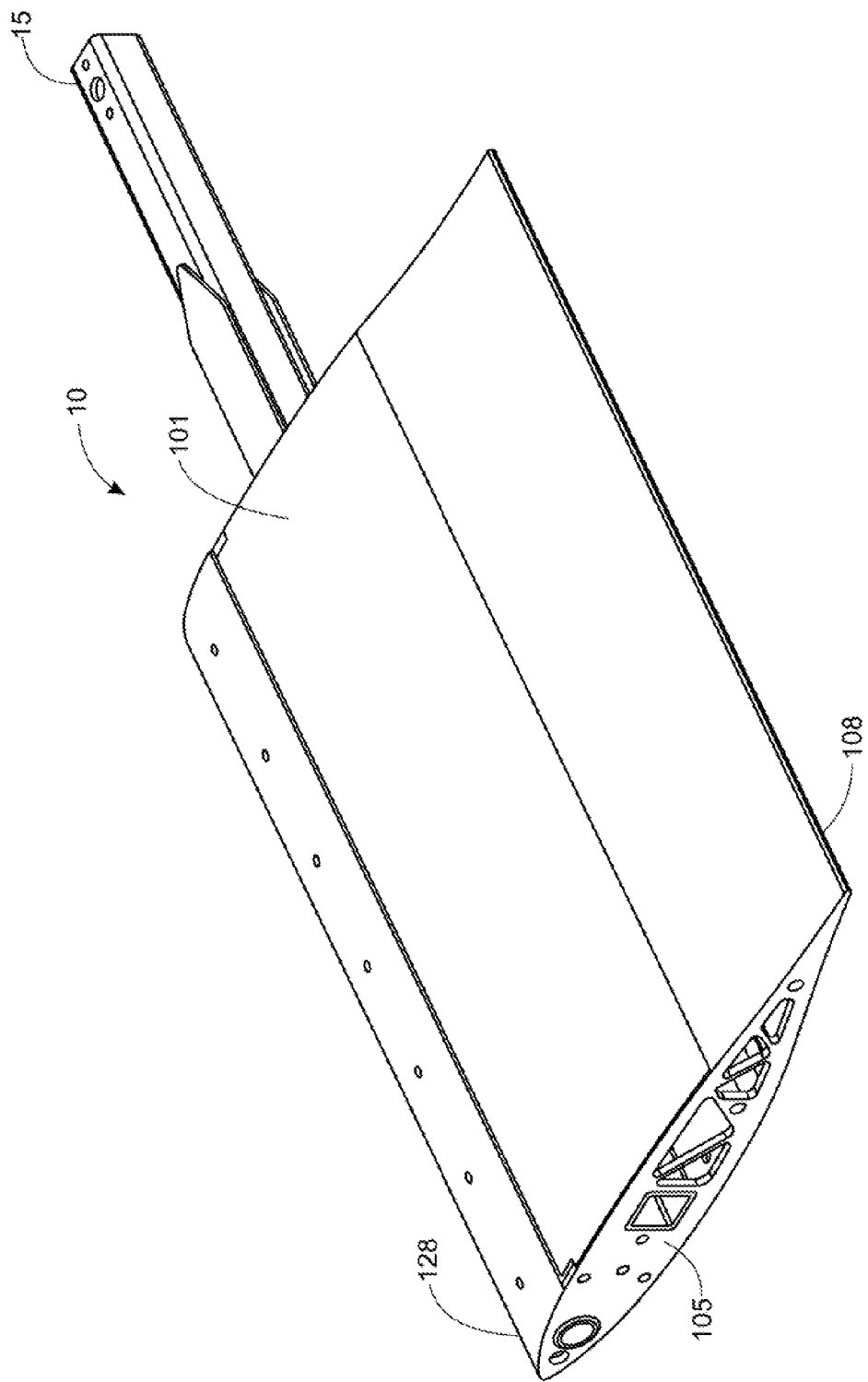
FIG. 1 is a perspective view of an airfoil section incorporating an aerodynamic brake assembly in a retracted state.
Figure 2:
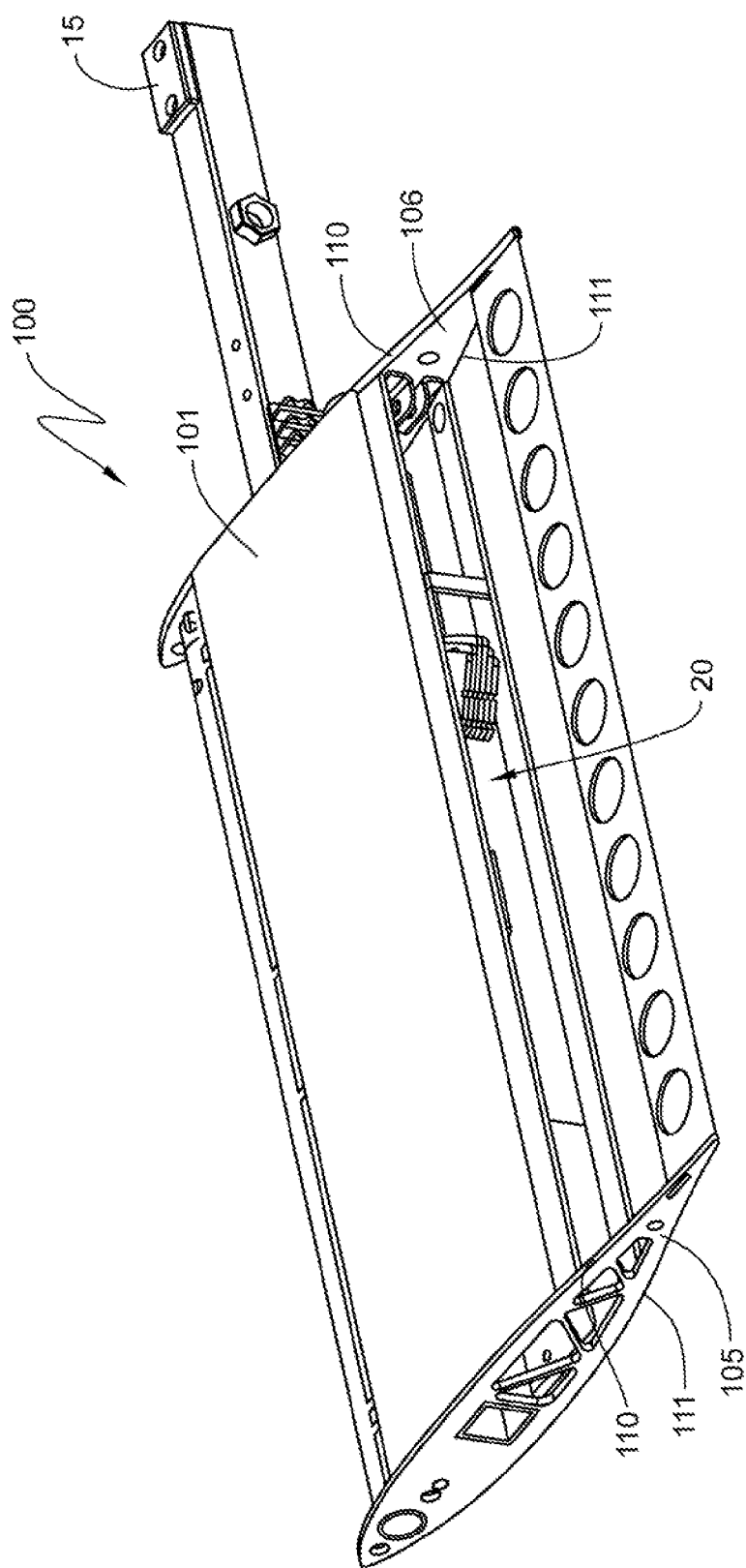
FIG. 2 is a perspective view of an airfoil section showing the spoiler plates of an aerodynamic brake assembly in isolation.
Figure 3:
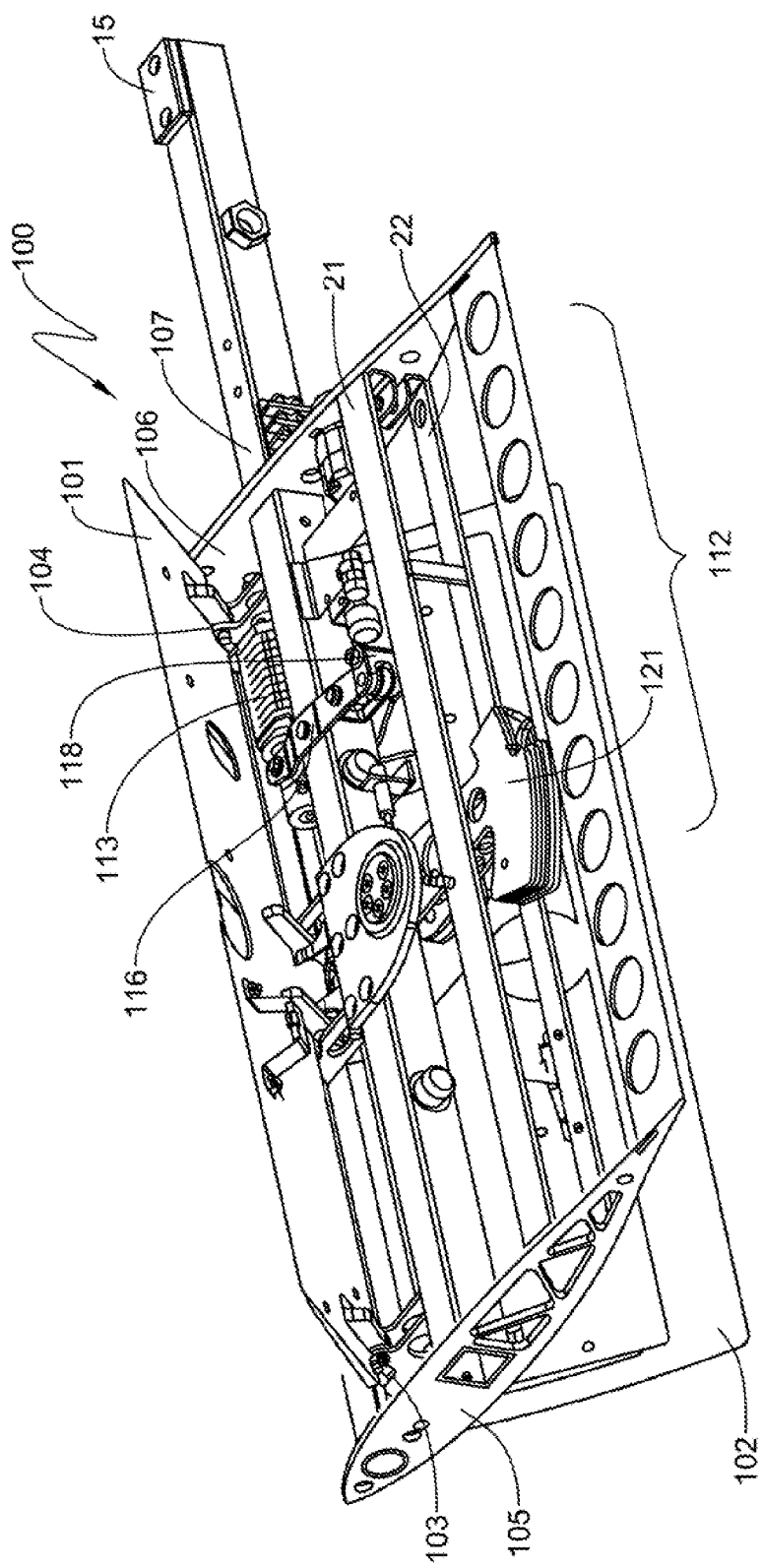
FIG. 3 is a perspective view of a partially deployed aerodynamic brake assembly.
Figure 4:
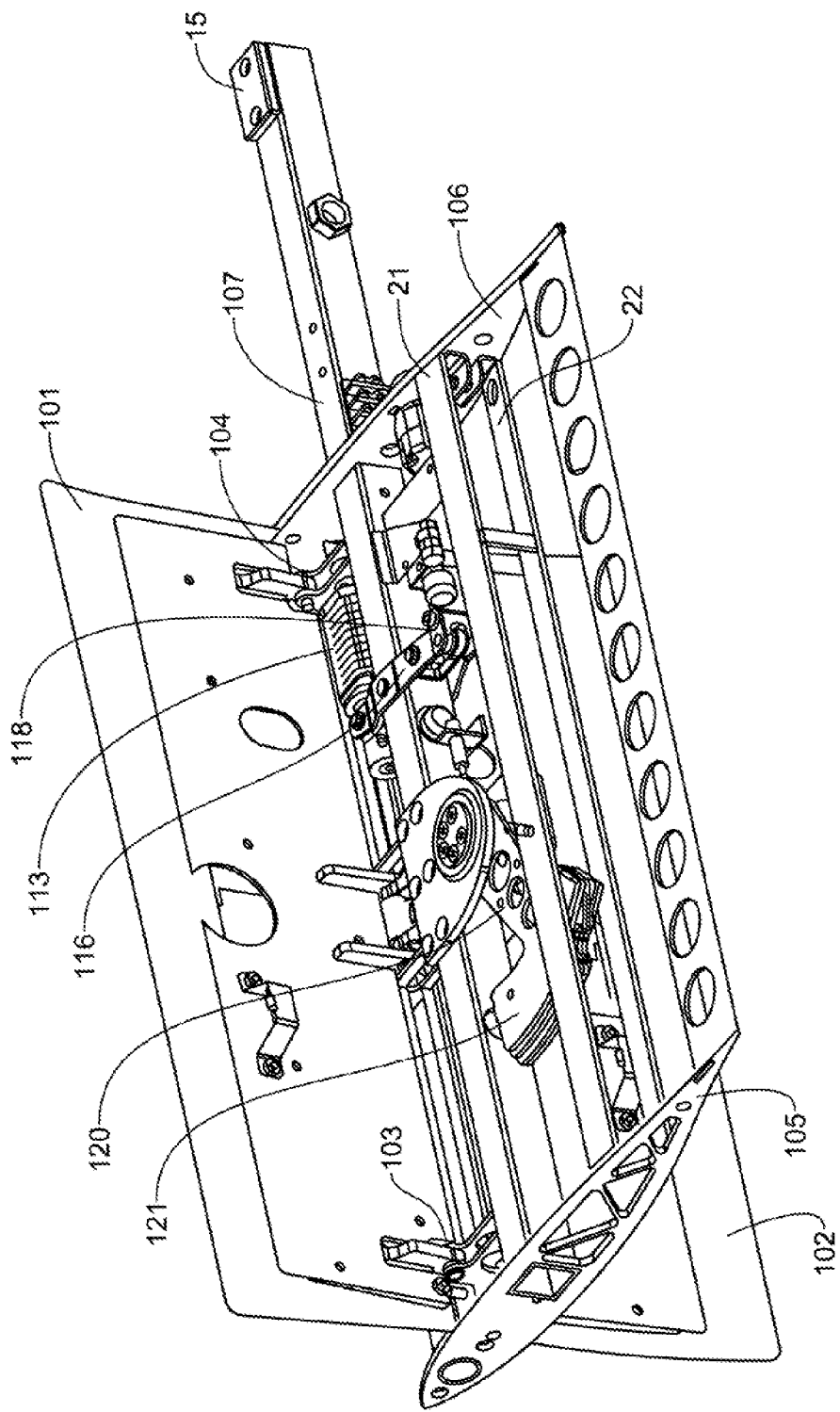
FIG. 4 is a perspective view of a fully deployed aerodynamic brake assembly.

As shown in FIG. 1, an aerodynamic brake assembly is incorporated into an airfoil section 10 that can be attached to an existing airfoil or wing via, for example, proximal spar section 15. Alternatively, airfoil section can be manufactured as an integral component of an airfoil. The braking component of the brake assembly comprises an extendable spoiler plate 101 on an upper or lower surface of the airfoil section 10. The spoiler plate can comprise a flat surface, or the surface can be slightly curvilinear to conform approximately to the three-dimensional contour of the airfoil to which the airfoil section is attached. As shown in FIG. 3, preferably, the brake assembly comprise's a pair of opposing spoiler plates 101, 102, each present on opposing upper and lower surfaces of the airfoil section 10. A spoiler plate 101 in a retracted position is shown in FIG. 2, which also reveals the cavity 20 within which the brake deployment mechanism is located. A pair of opposing spoiler plates 101, 102 in a partially extended position is shown in FIG. 3, which also reveals components of the brake deployment mechanism 112 within cavity 20. The spoiler plates 101, 102 are shown in a fully extended and braking position in FIG. 4. Referring to FIGS. 2-3, in an embodiment of the present invention, the aerodynamic brake assembly 100, shown in a retracted state, generally comprises a upper spoiler plate 101, lower spoiler plate 102, and a deployment mechanism 112. The aerodynamic brake assembly 100 may be incorporated into an airfoil section 10, such as a wind-driven turbine blade having an airfoil shape.

The airfoil structure of FIG. 1 in cross-section comprises a rounded leading edge 128 tapering to a sharper trailing edge 108. As shown in FIGS. 2 and 3, ribs 105, 106, having the characteristic airfoil shape, may be joined by a longitudinal structural member or spar 107 (FIG. 3) extending through the interior portion of the airfoil section 10. As a result of this configuration, an interior volume 20 created by the mostly hollow airfoil section 10 may facilitate the integration of the brake deployment mechanism 112 of an aerodynamic brake assembly 100. Such an assembly may reside between ribs 105, 106 of the airfoil section 10, as shown in FIGS. 2 and 3, and may generally attach directly or indirectly to spar 107, ribs 105, 106, plate rests 21, 22 or other internal structures of the airfoil section 10. Upper and lower fixed airfoil surfaces (removed for clarity in FIG. 2), can span upper and lower rib surfaces 110 and 111 (respectively), save for the areas covered by the upper and lower spoiler plates 101 and 102. The ribs 105, 106 and their corresponding upper and lower surfaces 110 and 111 define an internal region 20 of the airfoil section 10 in which the deployment mechanism 112 is arranged and configured to translate a longitudinal force acting generally parallel to the long axis of spar 107 into a transverse fore and aft force (i.e., from leading edge 128 to trailing edge 108) acting on a mechanism to facilitate deployment of the upper and lower spoiler plates 101 and 102 above and below their corresponding rib surfaces 110 and 111.

An example of a longitudinal force is the centrifugal force acting on an airfoil or wing of a rotating wind turbine rotor. In various embodiments, airfoil section 10 may be incorporated at any suitable location along the length of an airfoil, or positioned at a location near the outer tip of a wind turbine rotor blade, for example. Preferably, near-tip placement of the aerodynamic brake assembly 100 is preferred as the speed of a rotating airfoil is greatest at its outer tip. In various embodiments, aerodynamic brake assembly 100 may be attachable to the tip of a suitably configured airfoil by any fastening means known in the art (by using, for example, connecting bolts, rivets, welding or the like), or may be built into an airfoil at any desired point along its length.

In one embodiment, upper and lower spoiler plates 101 and 102 have dimensions of about 22 in.×7 in.; however, in various other embodiments dimensions may vary according to airfoil shape, size, mass, speed rating, etc. As shown, for example, in FIGS. 3 and 4, pivotal attachment of the spoiler plates 101, 102 to the airfoil section 10 is preferably configured near the leading edge 128 of the airfoil section 10 via leading edge hinges 103 and 104 near opposite lateral ends of the spoiler plates 101 and 102. The frame component of the hinge can be attached to the internal side of rib 105 or 106, and optionally can also be anchored to the adjacent forward side of spar 107 for added structural stability. A leading edge-oriented hinging mechanism on spoiler plates 101 and 102 allows airflow over airfoil section 10 to oppose the centrifugal forces that cause deployment of spoiler plates 101 and 102 through deployment mechanism 112. In 15 this way, spoiler plates 101 and 102 can automatically begin to retract when the drag forces on plates 101 and 102 begin to exceed the centrifugal forces acting on deployment mechanism 112.

The upper spoiler plate 101 may be pivotably attached via hinges 103 and 104 to ribs 105 and 106 of airfoil section 10 in a manner to conform to the shape of the upper and lower surfaces of the adjoining airfoil, thus contributing to the aerodynamic properties (e.g. lift) of the airfoil. In a similar fashion, the second spoiler plate 102 may be pivotably attached to the lower surface of the airfoil section 10 defined by the lower surfaces 111 of ribs 105 and 106. This bivalve spoiler configuration is preferable over a single-upper or single-lower spoiler design as it distributes upward and downward forces symmetrically on airfoil section 10 as the spoilers deploy, and may eliminate lengthwise torquing or distortion of the rotating airfoil (such as, e.g., a wind turbine rotor blade) during deployment. Placement of deployment mechanism 112 within the confines of airfoil section 10, and arranging spoiler plates 101 and 102 to generally conform to the shape of the upper and lower surfaces of the adjoining airfoil may result in a reduction of parasitic drag (drag caused by an aerodynamic brake in an un-deployed or retracted state) over other airfoil brake assemblies, such as, for example, the tip brake assemblies of the Entegrity Wind Systems Inc. model EW50 wind turbine. By way of example, total power loss from drag of three EW50 tip-brakes installed on a three-blade wind turbine operating at 66 RPM may be approximately 12 kW, whereas the present invention may substantially reduce or eliminate this power loss, and under some circumstances may be able to provide an increase in generated power.

In other embodiments (not shown), the spoiler plates can be configured primarily as drag brakes, with hinged attachments in an aft position on the spoiler plates, and the spoiler plates opening to face forward rather than aft. In this case, the leading edges of the spoiler plates are configured to spread apart under the influence of deployment mechanism 112 as well as the air flow over the airfoil, whereas the trailing edges of the spoiler plates are made to pivot inwardly. As the plates begin to deploy, the air flow across airfoil section 10 can facilitate further deployment of spoiler plates 101 and 102, rather than tending to oppose the forces causing their deployment. In this embodiment, the deployment mechanism 112 can reside forward of the spoiler plate hinges; thus the reciprocating link arm moves in a forward (windward) direction to pull the spoiler plates into a deployed position.

Figure 5:
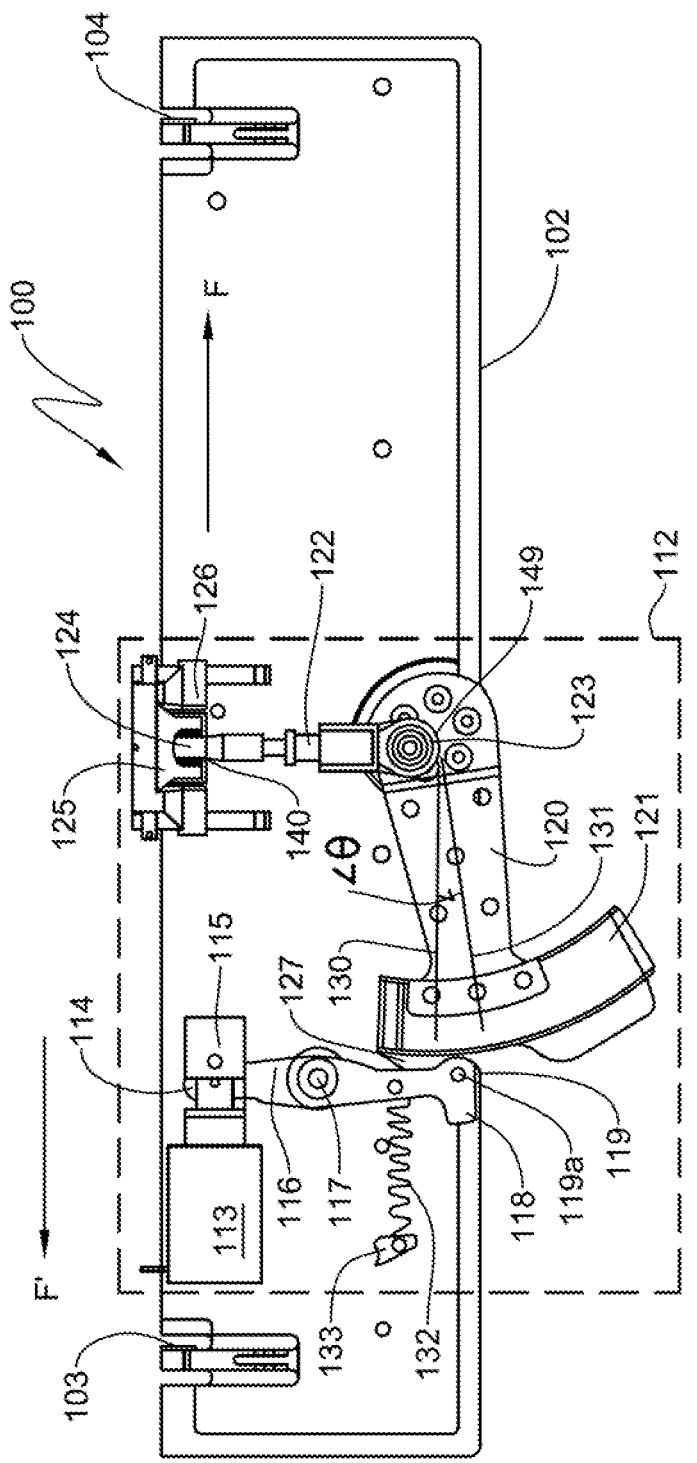
FIG. 5 is a plan view of an aerodynamic brake assembly with spoiler plates and airfoil structure removed.

FIG. 5 is a plan view of the aerodynamic brake assembly 100, shown in a retracted state, the upper spoiler plate 101 and airfoil section 10 structures removed for clarity. (Note that in FIGS. 5-8 and FIGS. 18 and 19, the distal end of the assembly, closest to the tip of the airfoil, is now on the right side of the illustrations, and the proximal end of the assembly, closest to the root of the airfoil, is on the left side of the illustrations.) The deployment mechanism 112 generally comprises a solenoid 113, pawl 116, weighted arm assembly comprising swing arm 120 and arm weight 121, reciprocating drive link 122, and linkages 125 and 126. The weighted arm assembly need not have the shape of an elongate arm per se, but it should have a mass distribution that is asymmetrical with respect to its axis of rotation. The deployment mechanism 112 harnesses centrifugal forces associated with rotational movement of the device to which it is attached, such as the rotor of a wind turbine, for example, and transforms such forces into first rotational and then linear mechanical motion required to deploy and retract spoiler plates 101 and 102. In a preferred embodiment, linear fore/aft movement of the drive link 122 actuates both upper and lower linkages 125 and 126 which respectively pivotably attach to the upper and lower spoiler plates 101 and 102. Linear fore/aft reciprocating movement of the drive link 122 can be achieved by pivotably joining the aft end 123 of the drive link 122 to a position on the weighted arm or a component connected to the weighted arm off the axis of rotation 149 of the weighted arm 120. When the weighted arm assembly 120/121 rotates in an arcuate path in a plane approximately parallel to the rotational plane of airfoil section 10, the aft end 123 of the drive link 122 also rotates in an arcuate path pulling the drive link 122 in an aft direction.

To allow weighted arm assembly 120/121 to respond to the centrifugal force F, swing arm 120 may be aft-biased such that it has a tendency to initially rotate about its axis 149 toward the trailing edge 108 of airfoil section 109. Aft-biasing can be accomplished in a number of ways, including, for example: (1) the center of mass of arm weight 121 can be offset with respect to the axis of rotation 149 of swing arm 120 in a direction toward the aft portion of the aerodynamic brake assembly 100; and/or (2) the centerline 131 of swing arm 120 when in a retracted position is oriented at an angle θ aft of line 130, which is approximately parallel to the long axis of the supporting member or spar 107, or the direction of centrifugal force F.

Figure 11A:
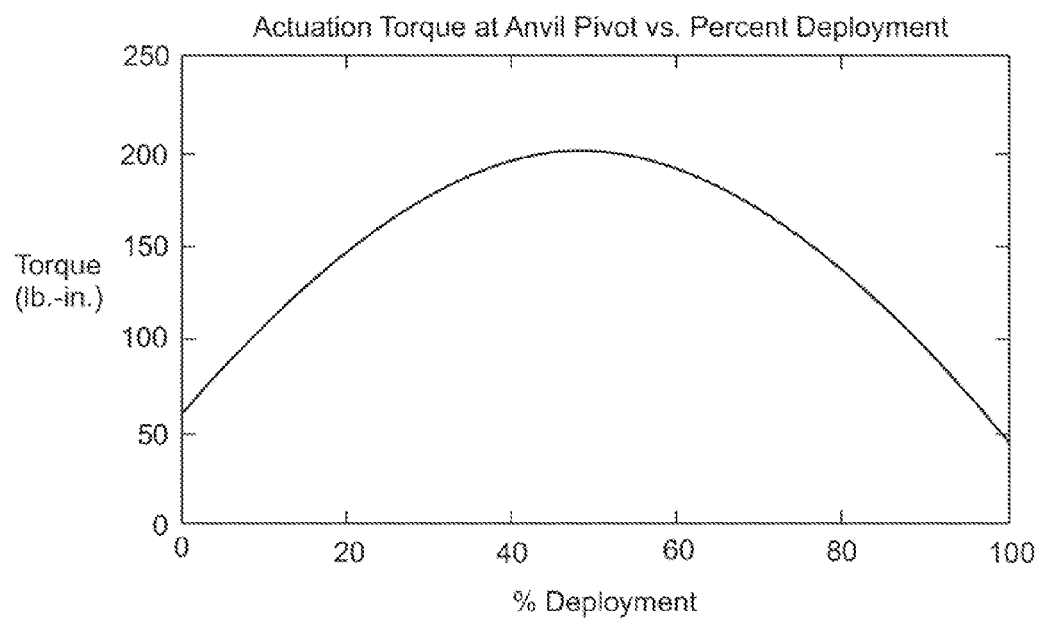
FIG. 11A is a graph of actuation torque at the axis of rotation of a weighted arm versus percent deployment of an aerodynamic brake assembly.
Figure 11B:
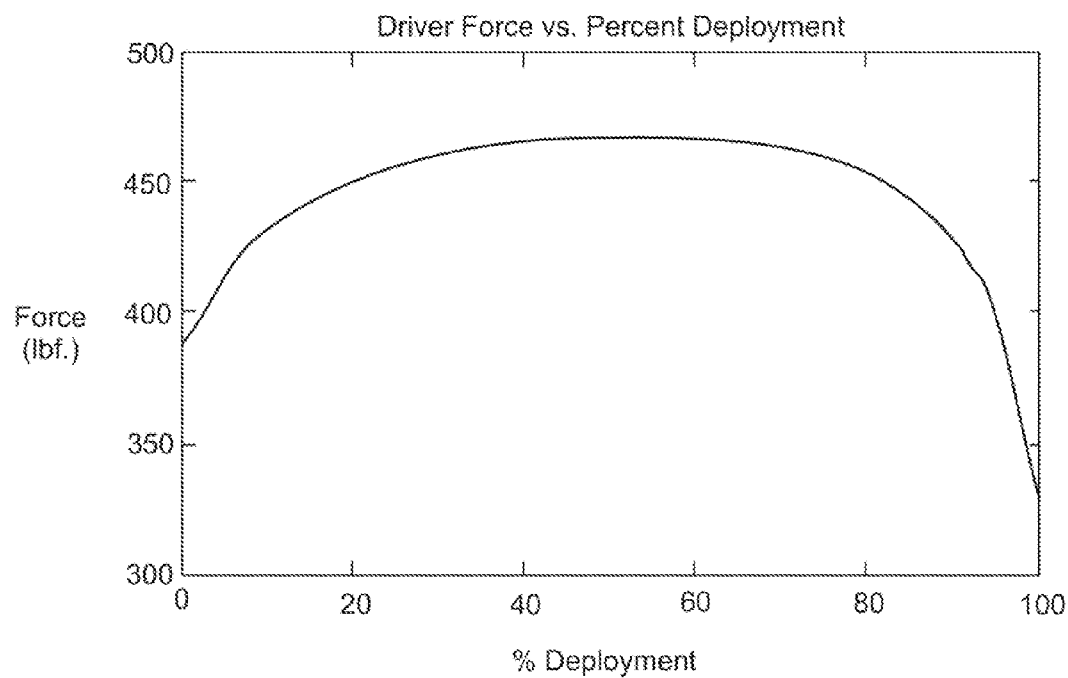
FIG. 11B is a graph of the force generated by a weighted arm versus percent deployment of an aerodynamic brake assembly.

As shown in FIGS. 11A and 11B, in an embodiment, the rotational path of swing arm 120 allows it to generate torque and force that gradually increases when it moves from a full retracted position (zero percent deployment), peaks at about 50% deployment, and thereafter gradually decreases as spoiler plates 101 and 102 reach full deployment. FIG. 11A shows the torque profile near the axis of rotation 149 of swing arm 120 as a function of percent deployment of spoiler plates 101 and 102. FIG. 11B shows a force profile of drive link 122 as a function of percent deployment of spoiler plates 101 and 102. This torque and force configuration may reduce stress on the deployment assembly 112 and airfoil section 10 as it allows weighted swing arm 120 to ease into deployment by slowly accelerating away from the pawl, reaching maximum torque and power near 50% deployment, and decelerating before reaching a state of 100% deployment. This is distinguishable from the abrupt and often violent motion profiles of more conventional tip-brake assemblies.

In some aspects, the initial value of torque generated by swing arm 120 may be varied by modifying the aft bias of arm weight 121. In other aspects, arm weight 121 can be biased forward of line 130, rotation of weighted arm then occurring toward the leading side of airfoil section 109, after disengaging with an appropriately configured pawl mechanism.

As shown in FIG. 5, swing arm 120 is freely rotatable but for the pawl 116 engaging an extension 127 on arm weight 121, holding the swing arm 120 in a retracted position. In one aspect, the engagement end 118 of pawl 116 may include engagement element 119, which may be capable of freely rotating about a connecting pin 119a mounted in engagement end 118, allowing pawl 116 to engage and disengage arm weight 121 with minimal friction. When retracted, swing arm 120, biased in the direction of force F, has a potential energy that increases with the centrifugal force F being generated by the rotating airfoil. Swing arm 120 begins its rotational movement about axis 149 only when extension 127 of arm weight 121 is disengaged from engagement end 118 of pawl 116.

Figure 18:
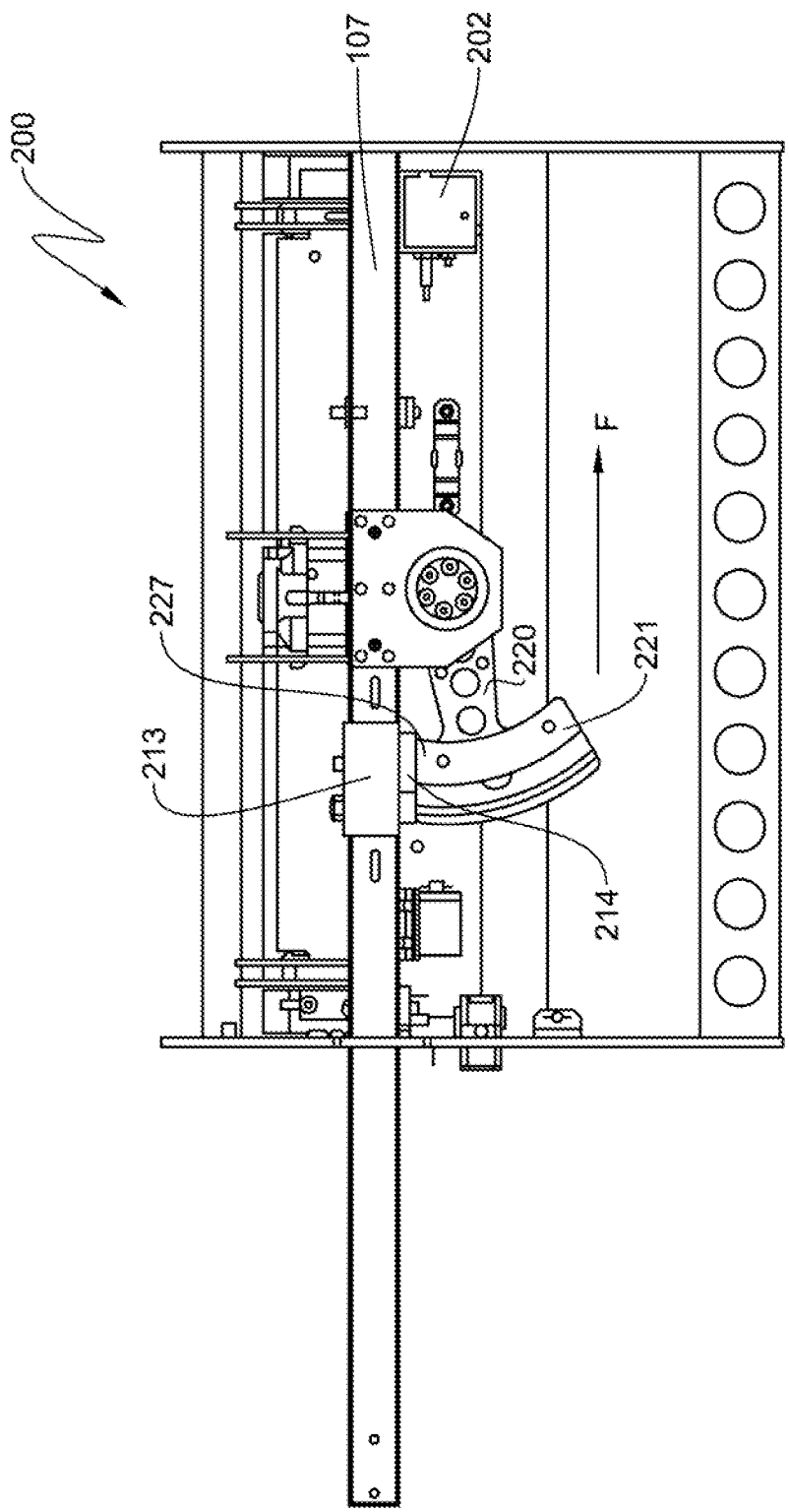
FIG. 18 is a plan view of an alternate embodiment of an aerodynamic brake assembly.
Figure 19:
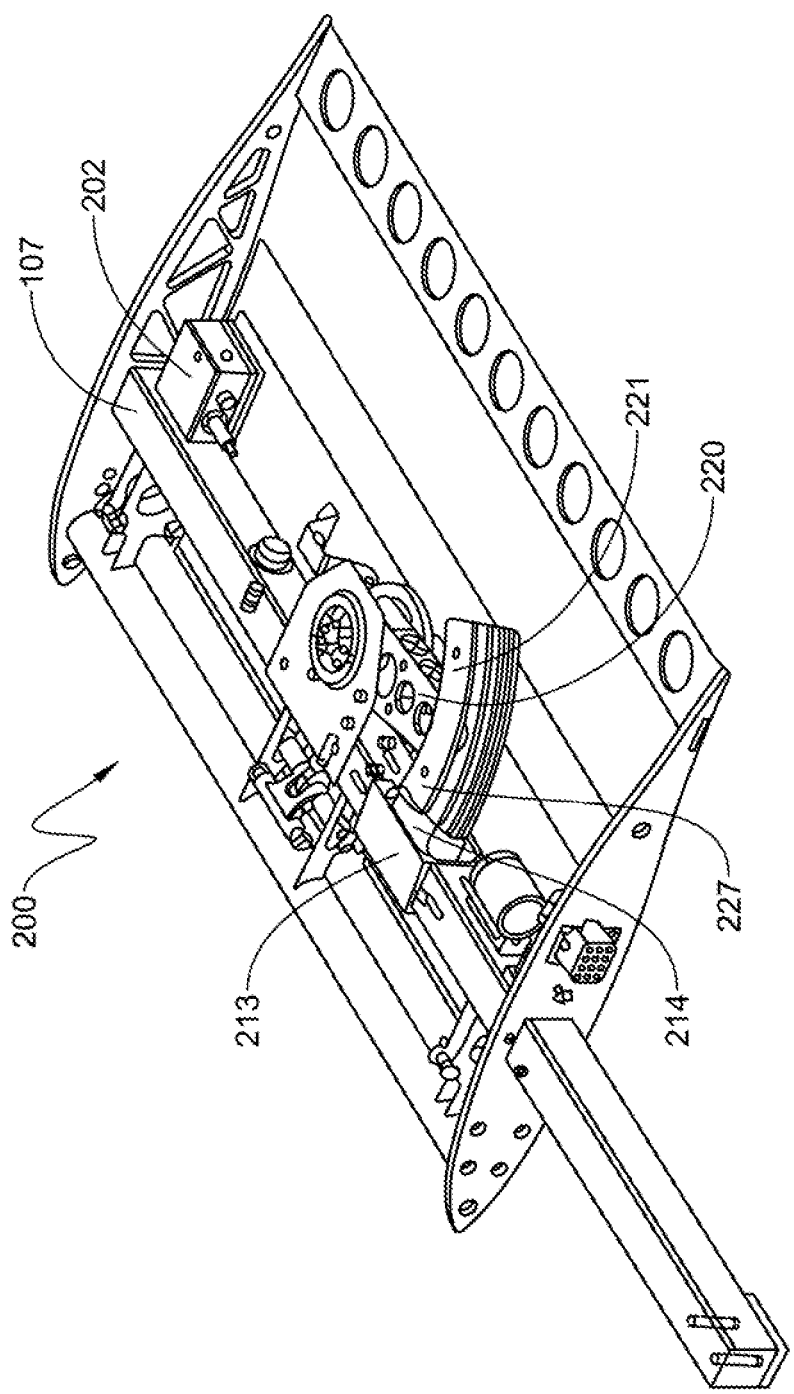
FIG. 19 is a perspective view of the aerodynamic brake assembly of FIG. 18.

Swing arm 120 may be held in a retracted position by means other than a solenoid, such as, for example, by use of a locking pin. In yet other embodiments, swing arm 120 may be held in a retracted position by contact with an electromagnet, without intervening pawl assembly. An exemplary embodiment of an electromagnet-based weighted arm holding assembly is shown in FIGS. 18 and 19, and is further discussed below.

Under normal operating conditions, pawl 116 can disengage arm weight 121 if electrical power to solenoid 113 is terminated. In an embodiment, when supplied with electrical power, solenoid 113 applies an electromagnetic force to attract the actuating end 114 of solenoid 113 toward the solenoid housing. When solenoid 113 is electrically activated, the proximal end of pawl 116, pivotably connected to the actuating end 114 of solenoid 113, keeps the engagement end 118 of pawl 116 engaged with extension 127 of arm weight 121. Any suitable solenoid can be used for this purpose, such as, for example, a Guardian Electric 24 volt DC tubular solenoid. As shown in FIG. 5, solenoid 113, for example, applies torque F' to the proximal end 114 of pawl 116 to oppose the centrifugal force F acting on the aerodynamic brake assembly 100 during normal operation. Pawl 116 is prevented from pivoting about its axis 117 as long as the opposing torque F' is greater than the centrifugal force F acting on the proximal end of pawl 116. When power to solenoid 113 is removed, the torque F' is substantially reduced (if not completely eliminated) which allows the pawl 116 to rotate about its axis 117 and away from extension 127. As shown in FIG. 5, a pawl release spring 132 can be connected from spring base 133 (e.g., a portion of spar 107 shown in FIGS. 3 and 4), to the arm of pawl 116 on the engagement side of pawl pivot point 117. Pawl release spring 132 acts to oppose the force of energized solenoid 113; so that once power to solenoid 113 is removed, the engagement end 118 of pawl 116 can quickly and reliably release arm weight 121. In one aspect, the pawl 116 may have a center of mass biased toward its proximal end 114 to augment the pawl release spring 132 torque during rotation of airfoil section 10.

The aerodynamic brake assembly 100 includes at least 3 modes of responding to overspeed conditions. A programmable logic controller ("PLC") may receive input from a sensor measuring the speed of rotation of the hub or associated shaft to which the airfoil is attached. In the case of a wind turbine, for example, the PLC can monitor the hub or associated shaft for speeds exceeding the operating range of the wind turbine. For example, a preferred operating speed of the Entegrity Wind Systems model EW50 wind turbine may be approximately 60-66 RPM. The PLC can be programmed to discontinue electrical power to solenoid 113 if the optimal rotor speed is exceeded by 0-20%, for example, or up to about 78 RPM. Thus under normal operating conditions, the aerodynamic brake can be triggered through a properly functioning PLC.

There may be circumstances in which the PLC may malfunction, or power to the PLC is interrupted, but in which power to solenoid 113 is preserved. In a second mode of operation, a centrifugal force switch may be interposed in the electrical circuit leading to solenoid 113. The centrifugal force switch can be set to interrupt electrical power to solenoid 113 when the rotating airfoil reaches a threshold rotational speed of 80-100 RPM, for example. As shown in FIG. 18, a centrifugal force switch housing 202 can be mounted within the cavity 20 housing the brake deployment mechanism 112. The switch can be connected in series with the electrical circuit providing power to solenoid 113 in FIG. 5, or electromagnet 213 shown in FIG. 18.

Figure 6:
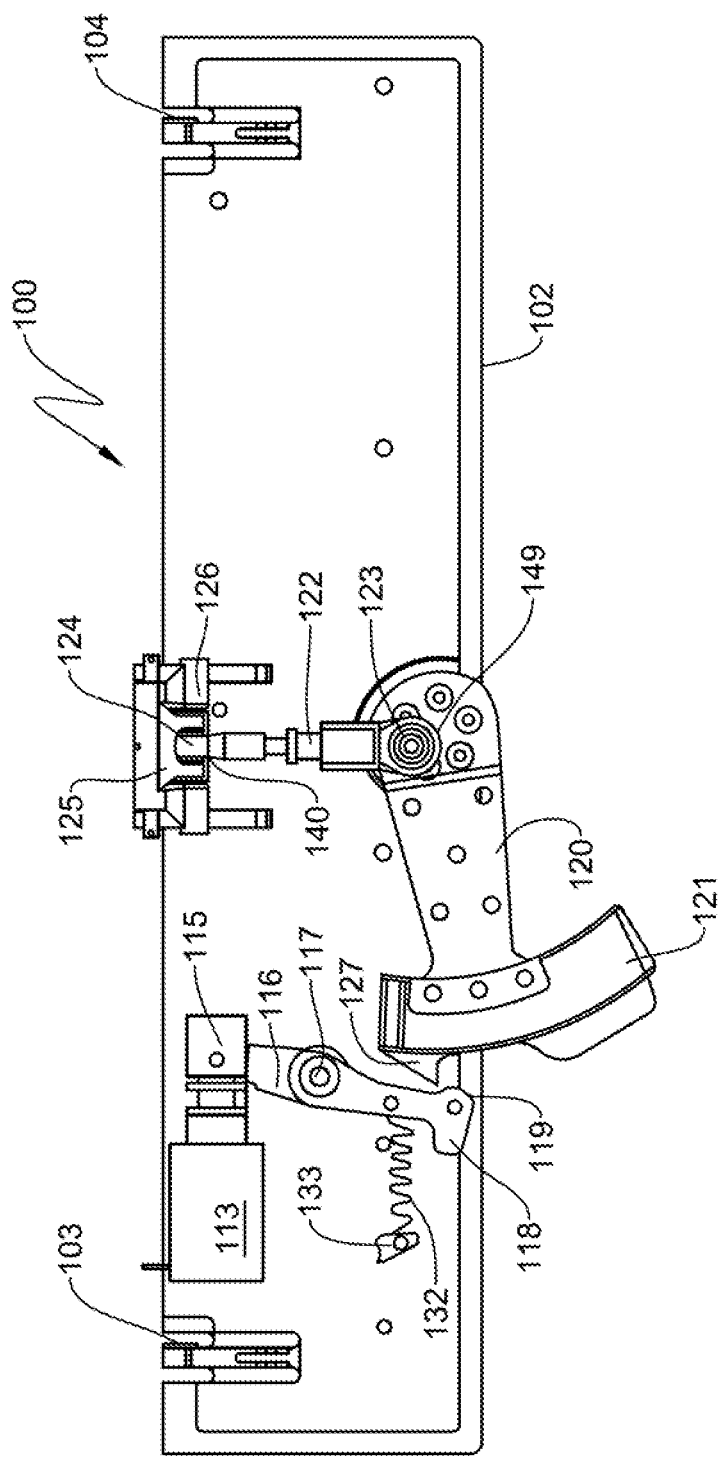
FIG. 6 is a plan view of an aerodynamic brake assembly with spoiler plates and airfoil structure removed.
Figure 9:
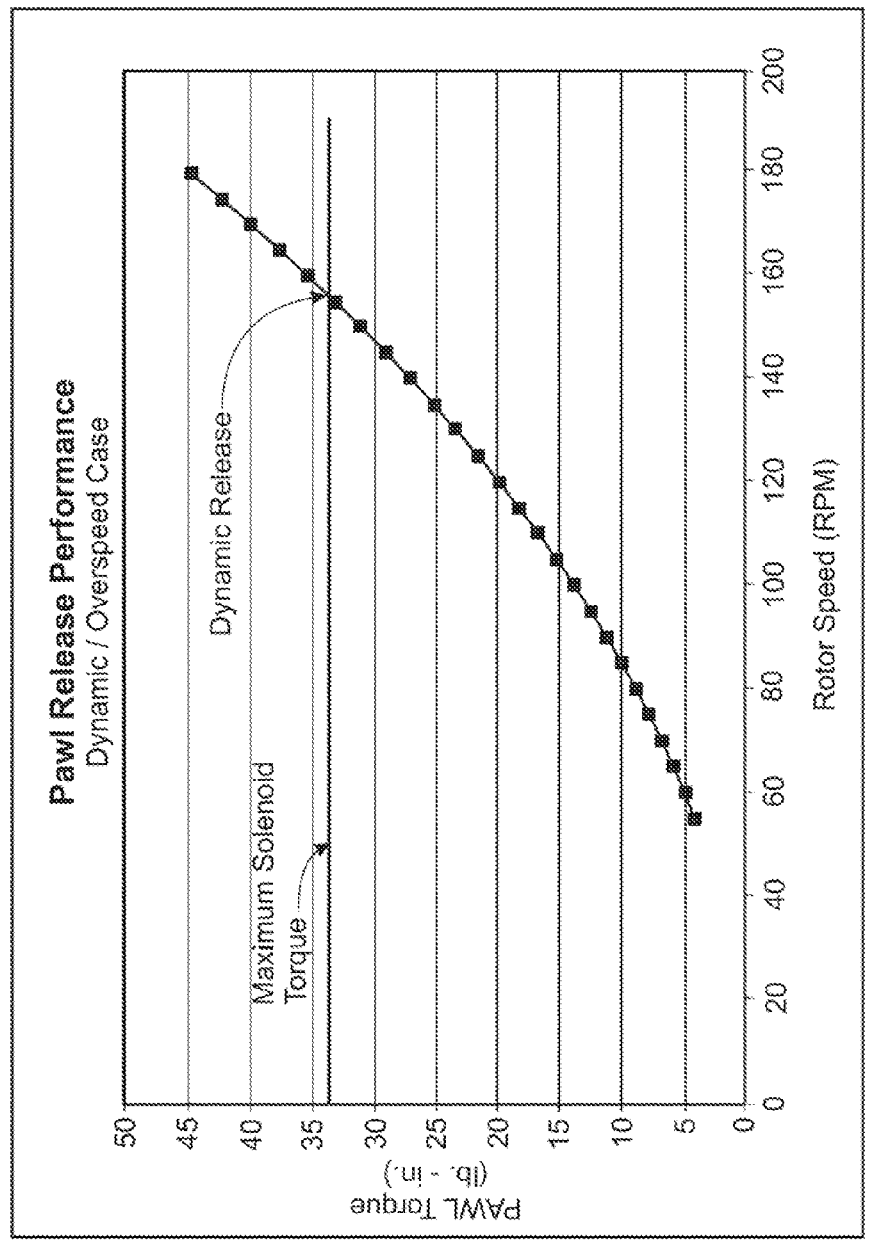
FIG. 9 is a graph of the pawl release performance of an aerodynamic brake assembly up to overspeed conditions.
Figure 10:
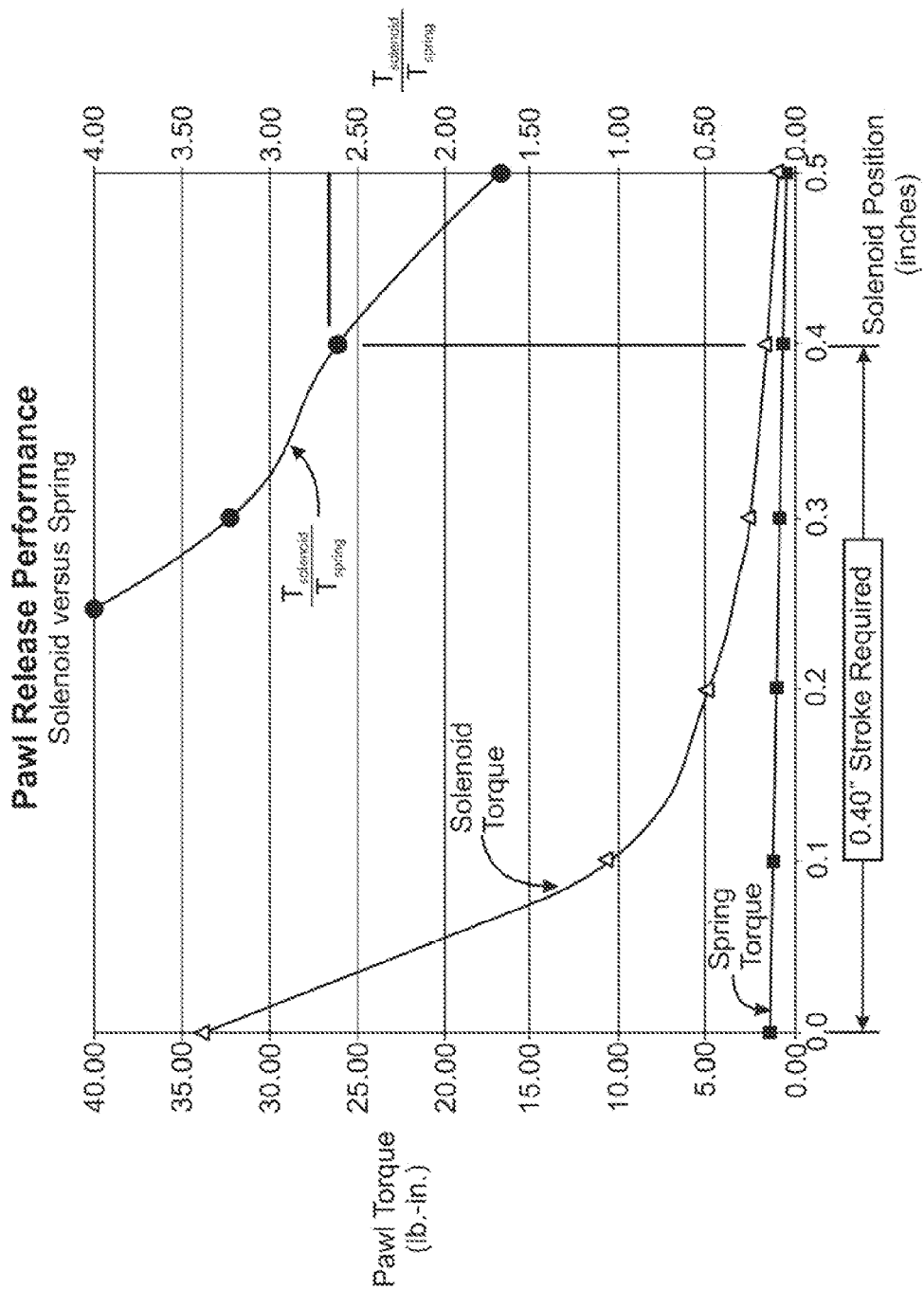
FIG. 10 is a graph comparing the static torsion characteristics of an exemplary solenoid compared to an exemplary pawl release spring.

A third failsafe mode of protection against an overspeed condition can be included for cases in which the centrifugal switch may fail to interrupt power to solenoid 113. In that case, a pawl biasing mass 115 can be added to the actuating end 114 of solenoid 113, the mass capable of generating sufficient centrifugal force during rotation of the airfoil to overcome the holding force generated by the electromagnet of solenoid 113. In an embodiment, a solenoid weight 115 can be affixed to the actuating arm 114 of solenoid 113, onto which the proximal end of pawl 116 can be pivotably connected. The mass of solenoid weight 115 can be selected to overcome the retracting force of solenoid 113 on the proximal end of pawl 116 whenever the rotating airfoil reaches a specified threshold angular velocity at airfoil section 10. FIG. 6 shows the aerodynamic brake assembly 100 in an initial state of deployment wherein the engageable end 118 of the pawl 116 has rotated toward the spring base 133. In other various embodiments, a pawl-release spring 132 may not be necessary as the weighted actuating end 114 of solenoid 113 or a heavily proximally biased pawl 116 may provide the necessary release force in response to the centrifugal force F. Thus, an overspeed condition of the rotating airfoil at airfoil section 10 may also cause deployment of the spoiler plates 101 and 102. In the event that the rotational speed of airfoil section 10 becomes excessive, centrifugal load-torque acting on the proximal end of pawl 116 and weighted 115 portion of the solenoid actuating end 114 may overpower the energized solenoid 113, mechanically releasing the weighted arm assembly 120/121, and causing the spoiler plates 101 and 102 to deploy. Deployment via an overspeed condition generally serves as a last line of defense for a wind turbine. Such a defense mechanism may be crucial in preventing damage to the device if a programmable logic controller ("PLC") fails to sense and correct the overspeed condition, for example. As shown in FIG. 9, in an embodiment, the maximum torque generated by the solenoid 113 is approximately 34 lb.-in. The weighted portion 115 of the solenoid actuating end 114 may be designed, for example, to generate a pawl release torque that is only 20% of the holding torque of the solenoid at the maximum working speed of the rotating airfoil. In an embodiment, the rotational speed at which 100% of the holding torque is overcome, resulting in release of weighted arm assembly 120/121 by pawl 116 and deployment of spoiler plates 101 and 102, can be set, for example, at approximately 140-160 RPM. Non-limiting ways to set the overspeed threshold at a particular rotational speed include: selecting a solenoid with appropriate torque characteristics, altering the voltage applied to the solenoid, varying the mass of the weighted 115 portion of the solenoid actuating end 114, altering the geometry of pawl 116, or altering the characteristics of pawl release spring 132, or its geometry in relation to pawl 116. FIG. 10 shows an example of the static environment characteristics of a selected solenoid (Magnetic Sensor Systems model # S-22-150) with an applied voltage of 76.4 VDC and selected pawl spring (Century #5227) with an initial spring deflection of 0.28 inches. In this example, the torque generated by the solenoid approaches that of the pawl release spring at a solenoid position of approximately 0.5 inches.

The above spoiler plate deployment arrangement is designed as a fail-safe feature to prevent an extreme overspeed condition, even if there is a failure of the control systems to discontinue the power being supplied to solenoid 113. Preferably, for example, a centrifugal force switch 202 (FIGS. 18, 19) that is capable of sensing an overspeed condition can be incorporated into the aerodynamic brake assembly 100 to prevent the aforementioned mechanical overspeed deployment. The switch may be calibrated to discontinue electrical power to the solenoid 113 at a lesser speed, within the range of 80-120 RPM, for example. This configuration may further minimize the risk of damage to the airfoil and aerodynamic brake assembly 100.

Figure 7:
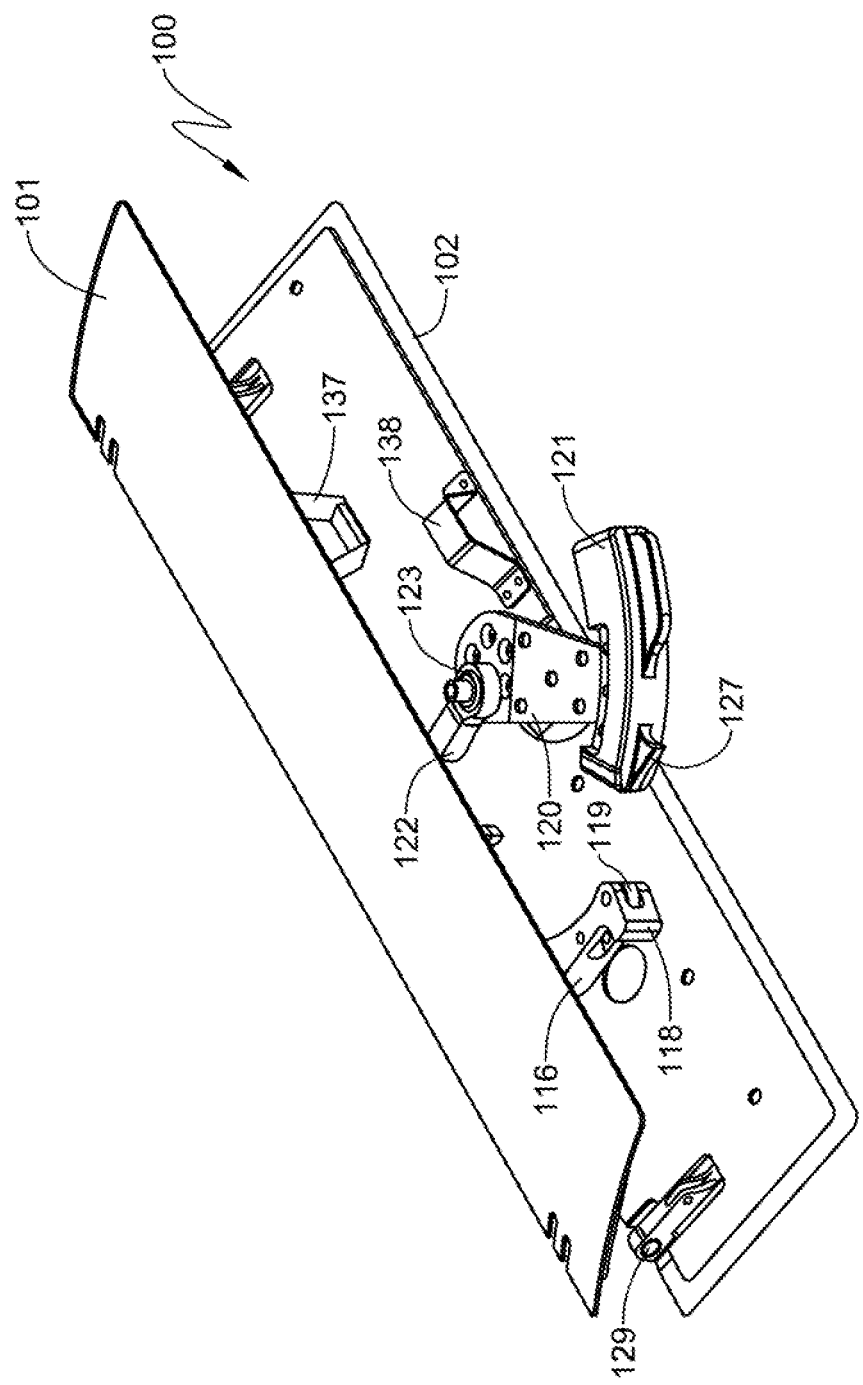
FIG. 7 is a perspective view of an aerodynamic brake assembly with the airfoil structure removed.
Figure 8:
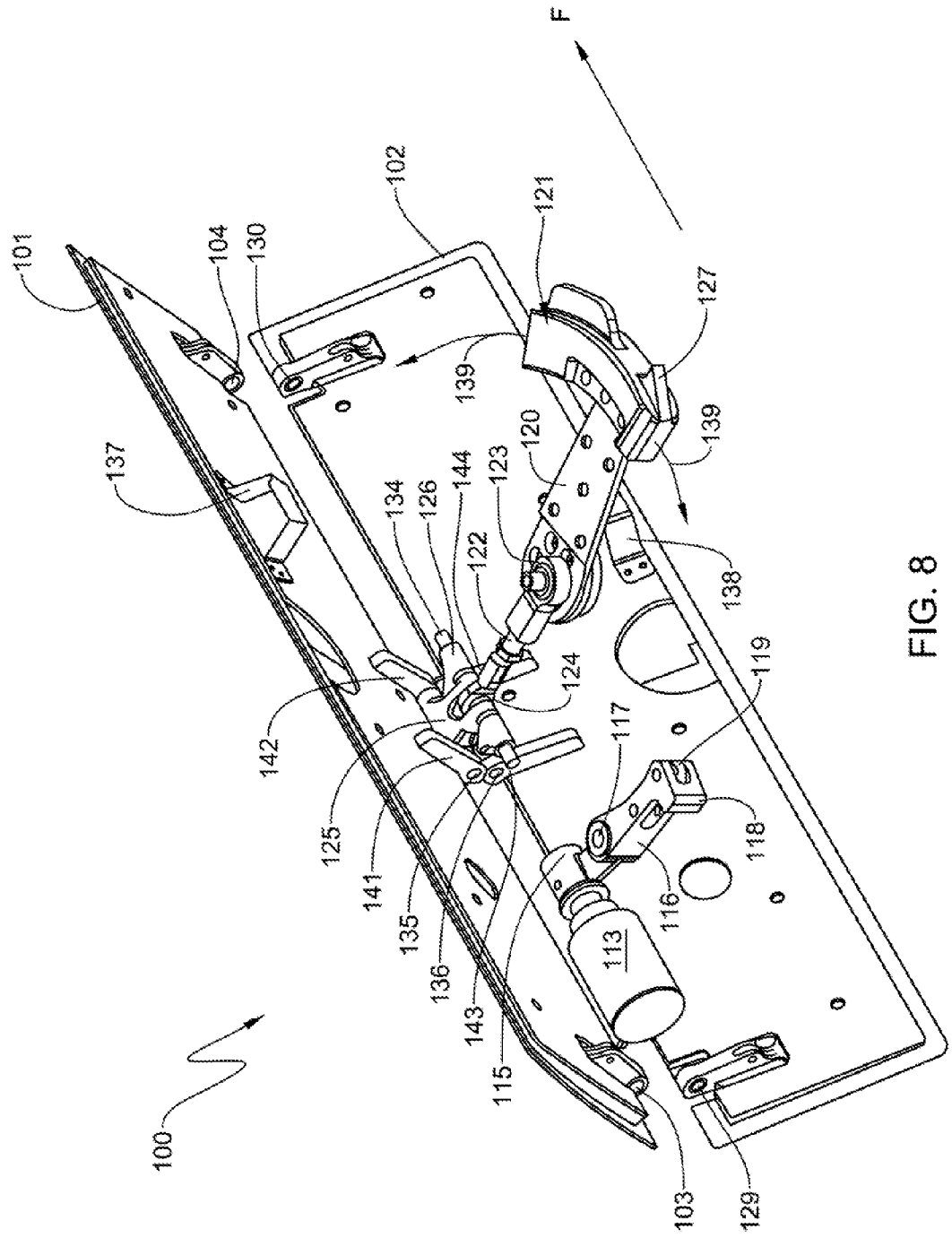
FIG. 8 is a perspective view of an aerodynamic brake assembly with the airfoil structure removed and the spoiler plates partially deployed.

FIG. 7 shows the aerodynamic brake assembly 100 in a state of early deployment, whereas FIG. 8 shows the aerodynamic brake assembly 100 in a state of approximately 50% deployment. In this position, the arm weight 121 and aft end 123 of drive link 122 move in the direction of arcuate path 139. By virtue of its eccentric connection to the base of swing arm 120, the aft end 123 of drive link 122 travels in both an arcuate and fore and aft direction. Upper and lower spoiler plates 101 and 102 rotate about upper hinges 103 and 104 and lower hinges 129 and 130 respectively, in response to fore and aft movement of the drive link 122. The fore end 124 of the drive link 122 may be pivotably and coaxially mounted with the aft portion of each linkage 125 and 126 at rear linkage axis 134. To account for slight rotational movement of the aft end 123 of the drive link 122 about axis 149, the upper linkage 125 may provide a small gap 140 (see FIG. 5) between the drive link 122 and the upper linkage 125. Alternatively, in various embodiments, the drive link 122 may incorporate a vertically aligned hinge, for example, to accommodate such rotation. Preferably, a spherical bearing rod end can be used to link the fore end 124 of drive link 122 to linkages 125 and 126.

Figure 12:
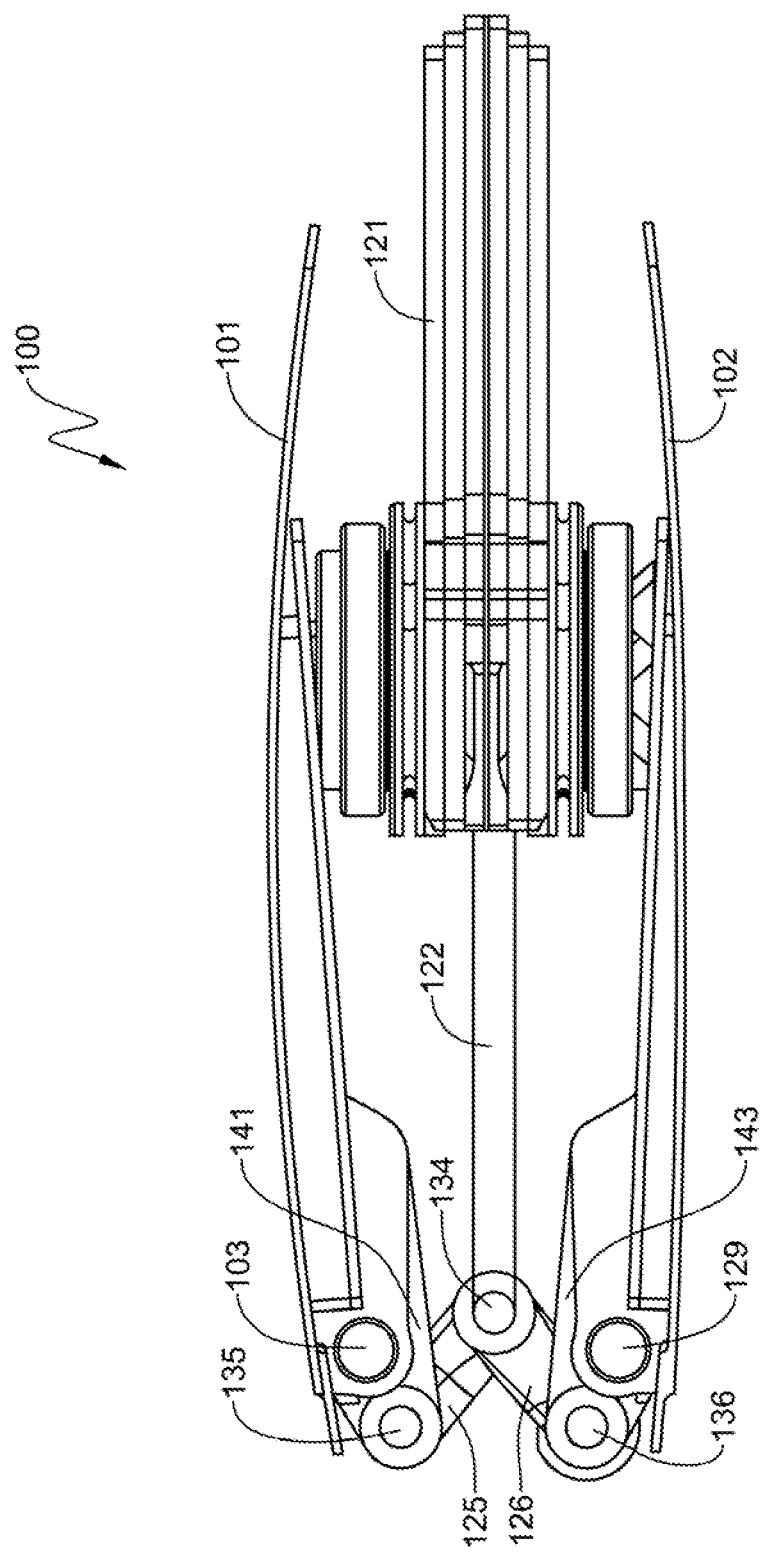
FIG. 12 is a side view of a retracted aerodynamic brake assembly.
Figure 13:
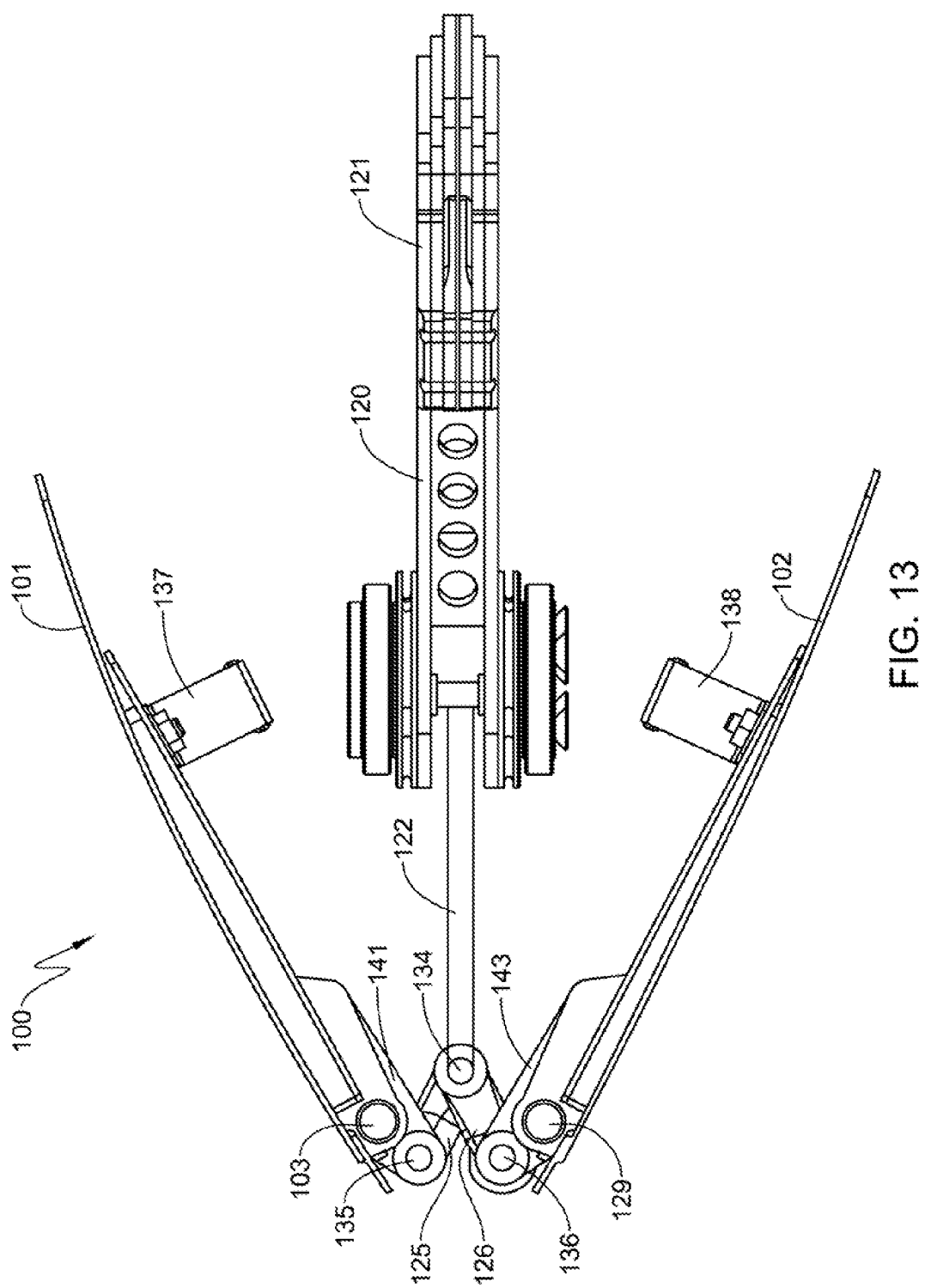
FIG. 13 is side view of a partially deployed aerodynamic brake assembly.
Figure 14:
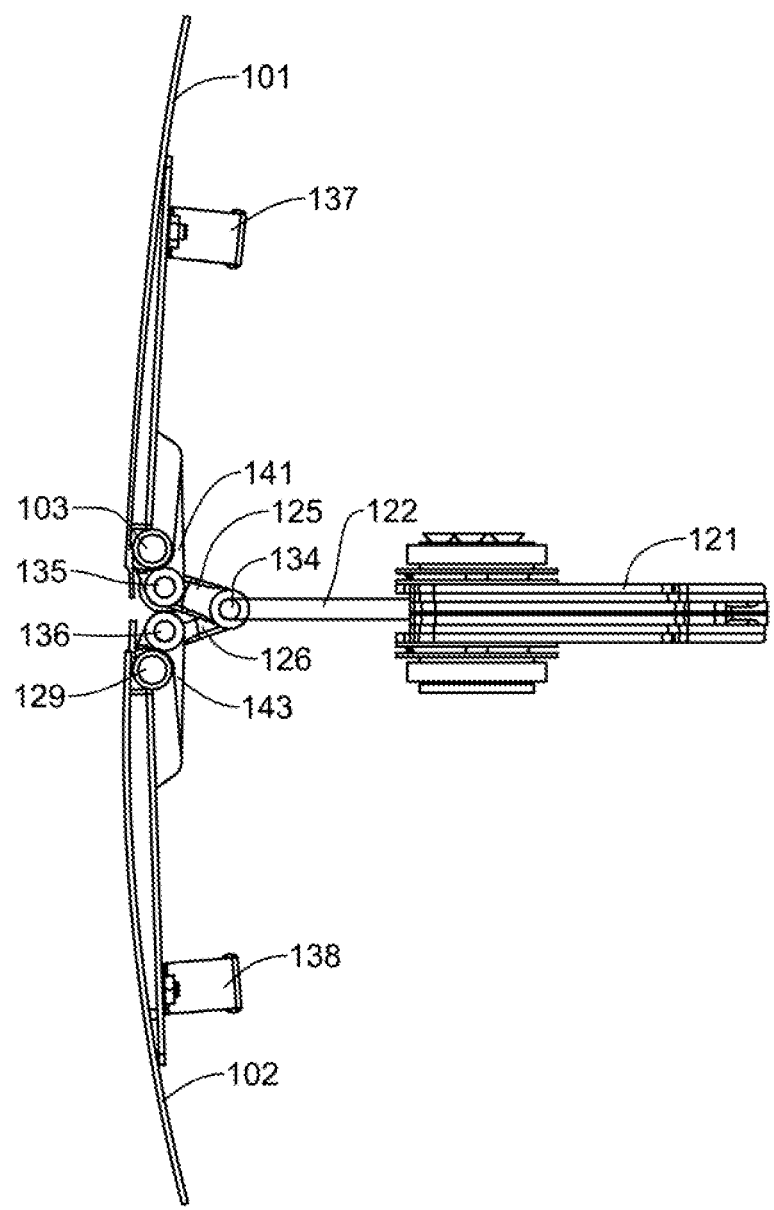
FIG. 14 is a side view of a fully deployed aerodynamic brake assembly.

As shown in side-view FIGS. 12-14, the spoiler plates 101 and 102 rotate about an imaginary axis drawn through each of hinges 103 and 129 as deployment is increased from 0% (FIG. 12), to approximately 30% (FIG. 13), and finally to 100% (FIG. 14). At 0% deployment, a retracted state, the rear linkage axis 134 remains stationary in its furthest forward position within the aerodynamic brake assembly 100. Stop members 137 and 138 (e.g. FIGS. 7, 13), extending inwardly from the interior surface of upper and lower spoiler plates 101 and 102, may ensure that each spoiler plate 101 and 102 remains flush with the upper and lower surfaces of airfoil section 10 when in a retracted position. In an embodiment, stop members 137 and 138 can include magnetic elements of opposing polarity to help ensure that upper and lower spoiler plates 101 and 102 remain firmly retracted.

As the pawl 116 disengages from the arm weight 121 as previously discussed, the drive link 122 moves in an aft direction, which in turn moves upper and lower linkages 125 and 126 and their corresponding leading edge hinges 135 and 136 in an aft direction, thereby generating torque on the leading edges of spoiler plates 101 and 102 at axes that are forward of upper spoiler plate hinges 103 and 104, and lower spoiler plate hinges 129 and 130 (See also FIG. 8). The forward offset between the axes of hinges 135 and 136 and hinges 103/104 and 129/130 (see, e.g., FIGS. 12-14) causes the aft portions of spoiler plates 101 and 102 to rotate about hinges 103/104 and 129/130 outward from the airfoil section 10 (see also FIGS. 3, 4). Upper and lower linkages 125, 126 are pivotably and coaxially joined to the drive link 122 at rear linkage axis 134 and pivotably joined via their respective leading edge hinges 135 and 136 to upper spoiler plate hinges 141 and 142 and lower spoiler plate hinges 143 and 144 respectively. This arrangement allows the drive link 122 to torque both upper and lower spoiler plates 101 and 102 simultaneously. As shown in FIGS. 12-14, due to the articulated or scissor-like movement of the linkages 125 and 126, leading edge hinges 135 and 136 are forced inward toward one another as each spoiler plate 101 and 102 rotates to a deployed position.

Figure 15:
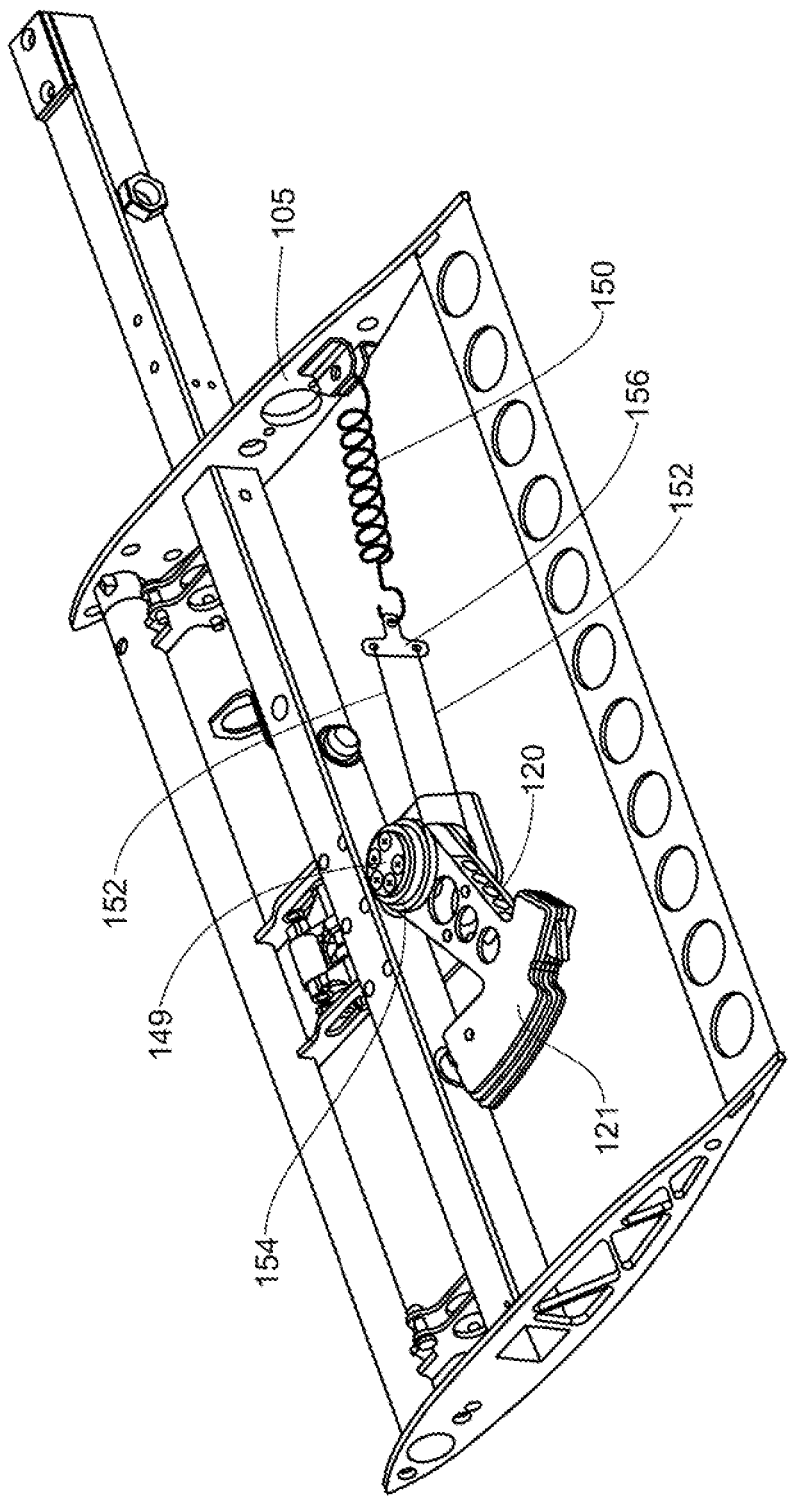
FIG. 15 is a perspective view of an aerodynamic brake assembly, including weighted arm return cables and spring.
Figure 16:
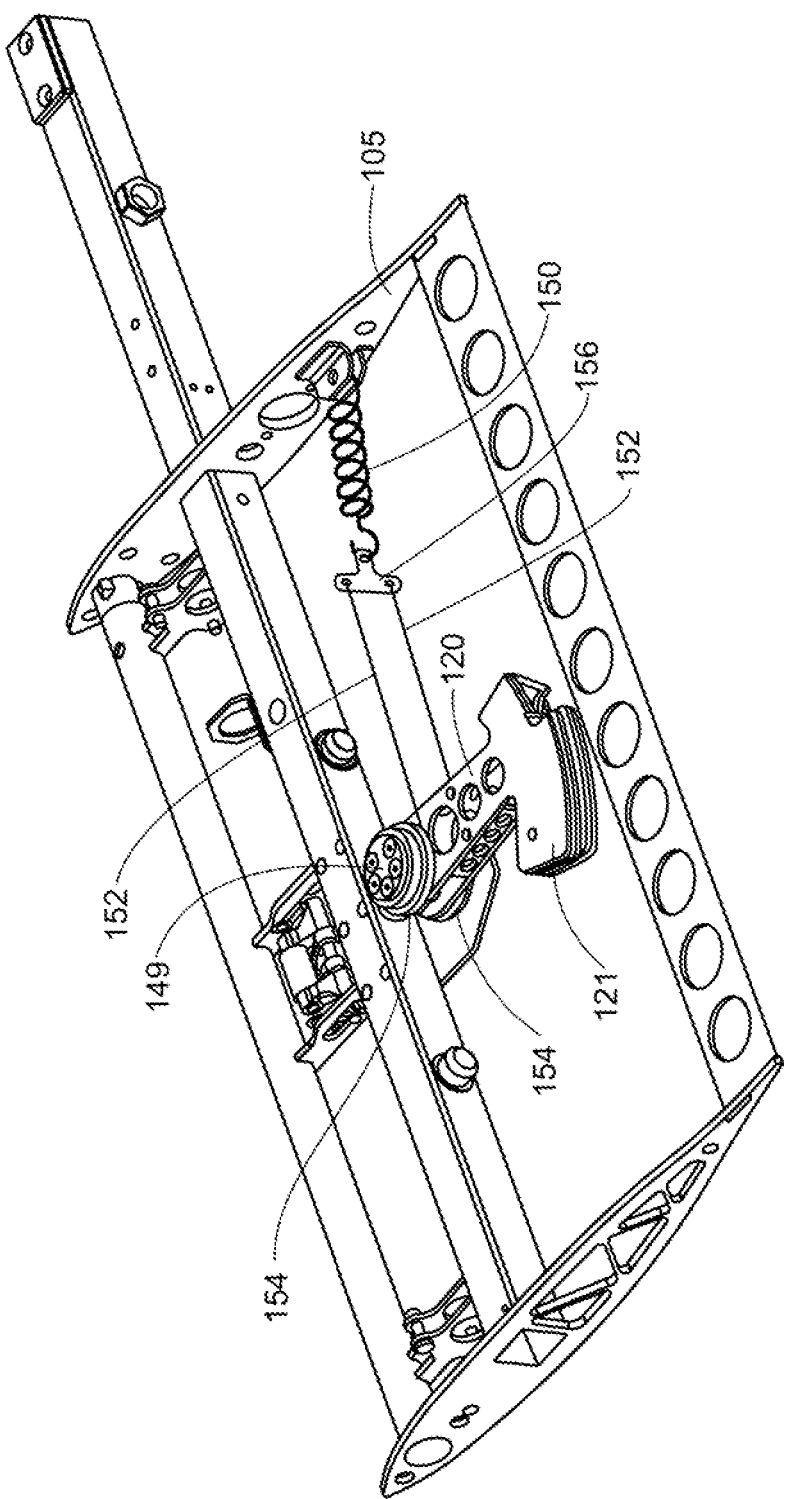
FIG. 16 is a perspective view of an aerodynamic brake assembly, including weighted arm return cables and spring.
Figure 17:
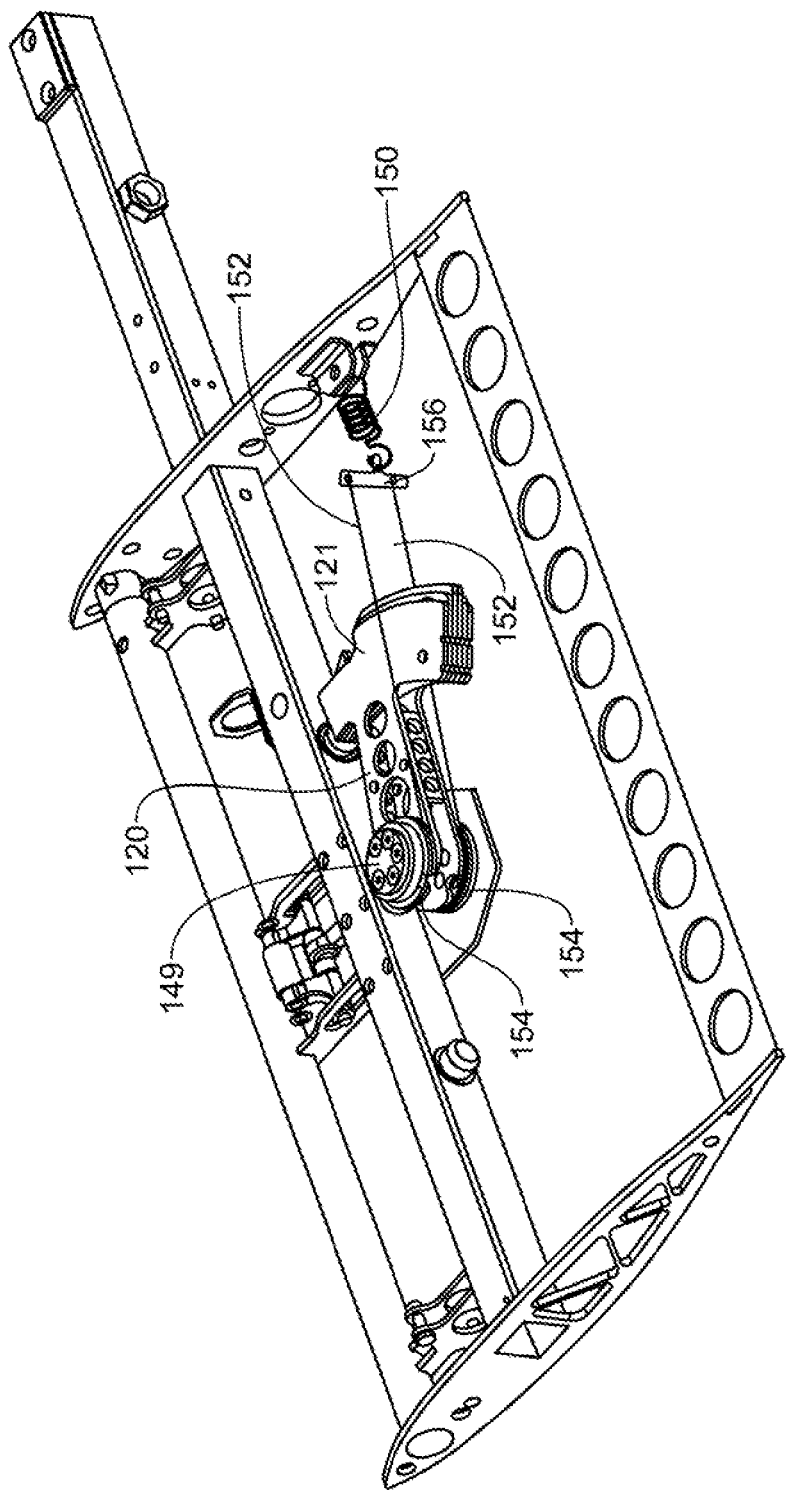
FIG. 17 is a perspective view of an aerodynamic brake assembly, including weighted arm return cables and spring.

In various embodiments, as shown in FIGS. 15-17, a swing arm return spring 150 secured at its base, for example, to the inner side of rib 105 (or other stationary structure within airfoil section 10), may attach to one or more cables 152 on its distal end, the cables in turn wrapping partially around a pulley 154 centered over axis 149 of swing arm 120. In one aspect, a pair of return cables 152 are attached to pulley 154, one above and one below swing arm 120, as shown in FIGS. 15-17. As shown in FIGS. 16 and 17, as weighted arm assembly 120/121 is pulled back by return spring 150 into a retracted position, the unwound portions of return cables 152 are long enough to allow arm weight 121 to clear the spring harness or bridle 156 connecting return spring 150 to return cables 152.

In one aspect, the pulley 154 is cam-shaped, or otherwise has a decreasing radius as it rotates to wind the return cables 152 as the weighted arm assembly 120/121 rotates away from its retracted position to a deployment position. The return spring 150 may ease weighted arm assembly 120/121 back to a retracted position after deployment and when an overspeed condition has resolved. If present, the caromed feature of pulley 154 can provide a decreasing radius between the cable and pulley axis to reduce the counteracting force of the return spring 150 against weighted arm assembly 120/121 as it begins to rotate into a deployment position. It may also help to moderate the return speed of weighted arm assembly 120/121 to its retracted position. The return spring 150 can be selected to have a spring rate small enough to cause retraction of the upper and lower spoiler pates 101 and 102 to occur only upon sufficient decrease in airfoil rotational speed. In some cases, it may be preferable to have spoiler plates retract only after the airfoil has ceased to rotate.

FIGS. 18 and 19 show an alternate embodiment of an aerodynamic brake assembly 200. A supporting member or spar 107 provides structural support for a weighted arm assembly comprising a swing arm 220 and arm weight 221. An electromagnet 213 can be mounted on supporting member or spar 107 and aligned with the trailing end of arm weight 221 in its retracted position. When supplied with electrical power, the working pole 214 of electromagnet 213 can attract and hold a ferromagnetic component 227 of arm weight 221. The magnetic field strength of electromagnet 213 and the mass and geometry of weighted arm assembly 220/221 and its angle with respect to spar 107 can be constructed to allow release of arm weight 221 when the airfoil reaches a specified failsafe rotational speed, generating a threshold amount of centrifugal force F along the axis of rotation of the airfoil. If deployment of the brake assembly is desirable at an airfoil rotational speed lower than the failsafe speed, a centrifugal switch (not shown) capable of sensing a pre-determined overspeed condition can be incorporated into the aerodynamic brake assembly 200. The switch may be calibrated to discontinue electrical power to electromagnet 213 at a specified airfoil rotational speed, such as, for example, 120 RPM. This configuration may further minimize the risk of damage to the airfoil and aerodynamic brake assembly 100.

In an embodiment, the maximum torque generated by the electromagnet 213 can be set above the release torque generated by weighted arm assembly 220 and 221 during rotation of the airfoil within its normal operational range. Upon reaching a specified overspeed condition (which can be set at, for example, a rotational speed of 160 RPM), the release torque generated by weighted arm assembly 220 and 221 overcomes the holding force generated by powered electromagnet 213. Thus weighted arm assembly 220 and 221, can be constructed and oriented to release in a fail-safe manner should there be a failure of the aerodynamic brake assembly control systems to discontinue supplying power to electromagnet 213.

Figure 20:
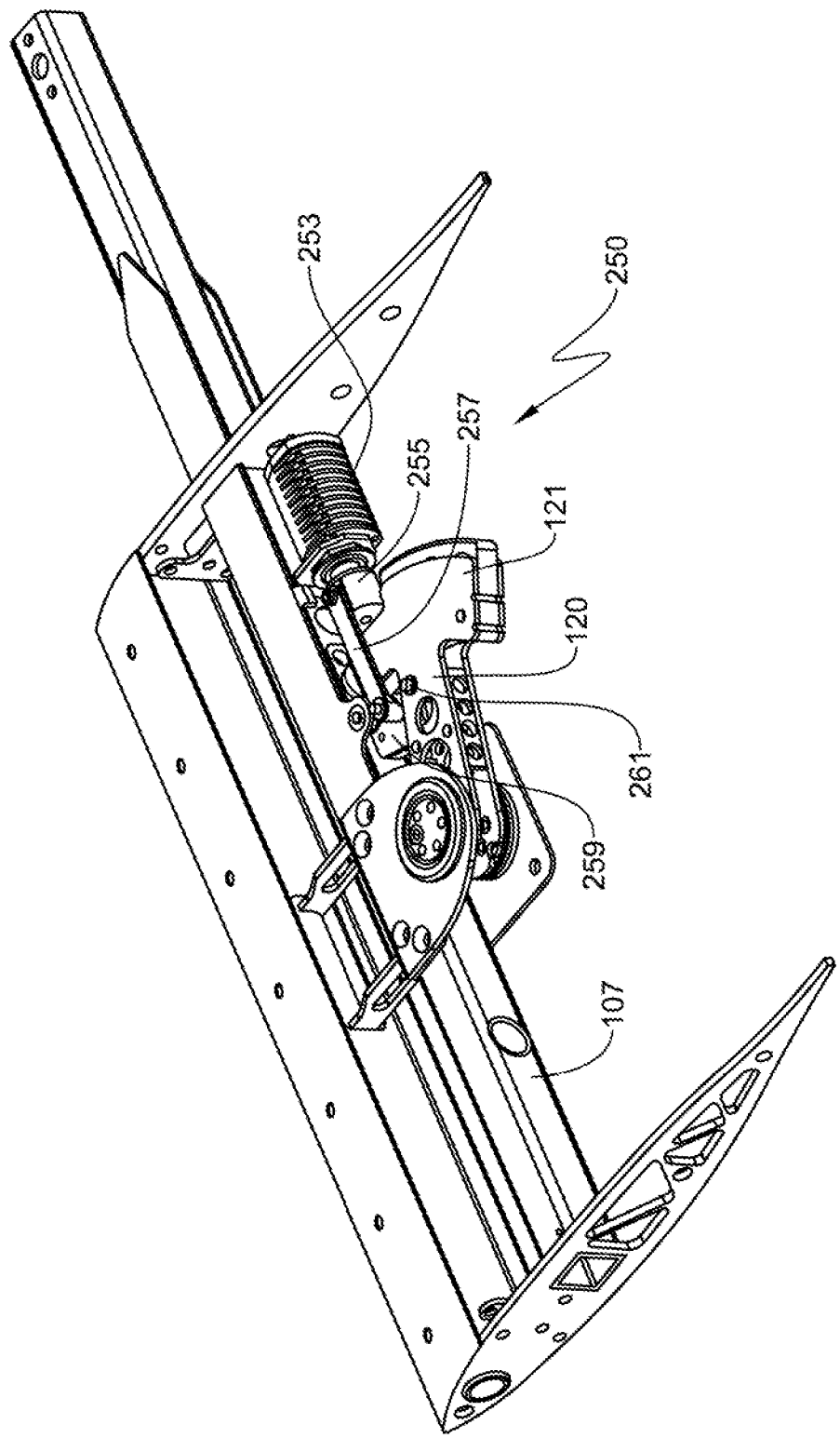
FIG. 20 is a perspective view of an alternate embodiment of an aerodynamic brake assembly.
Figure 21:
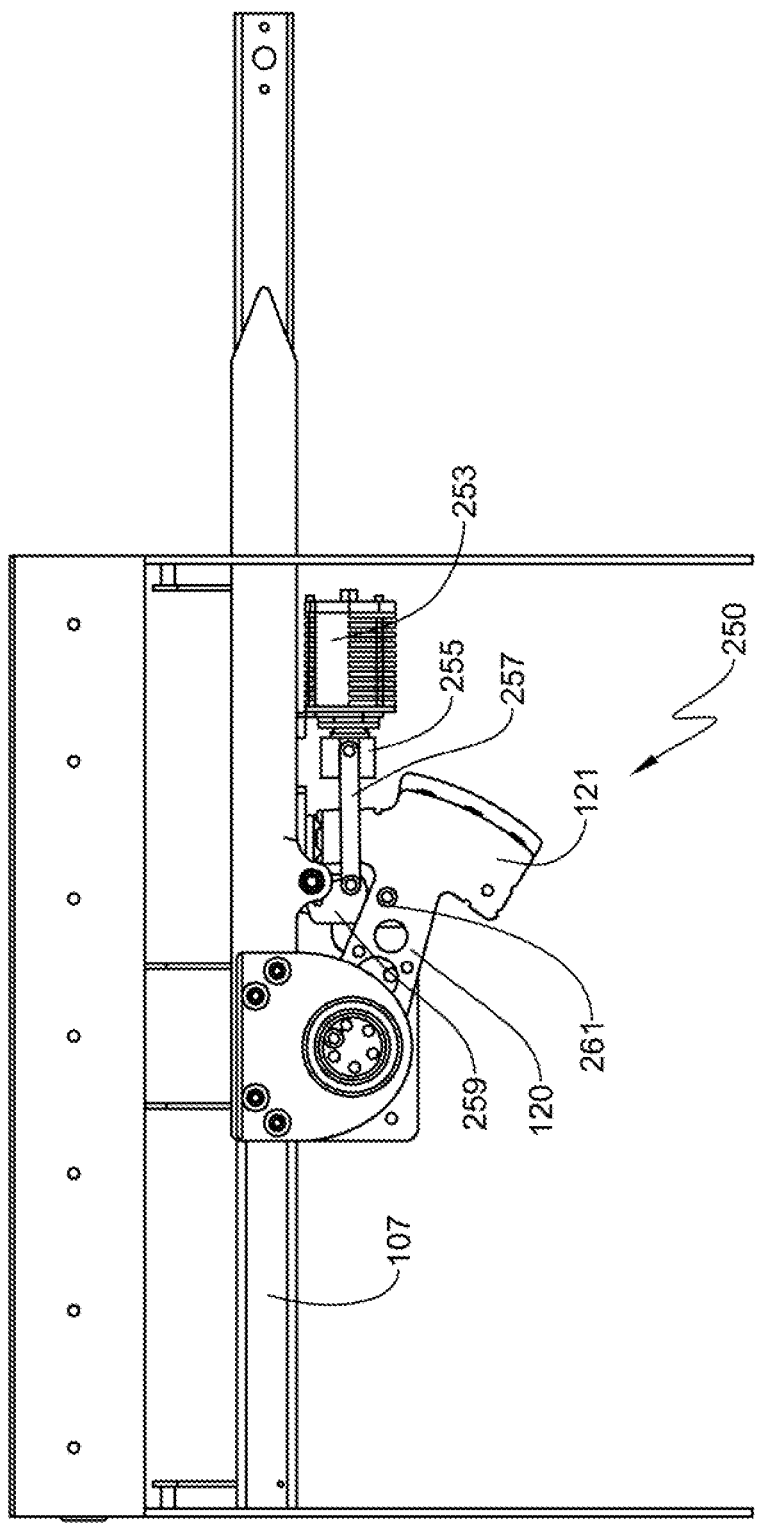
FIG. 21 is a plan view of the aerodynamic brake assembly of FIG. 20.
Figure 22:
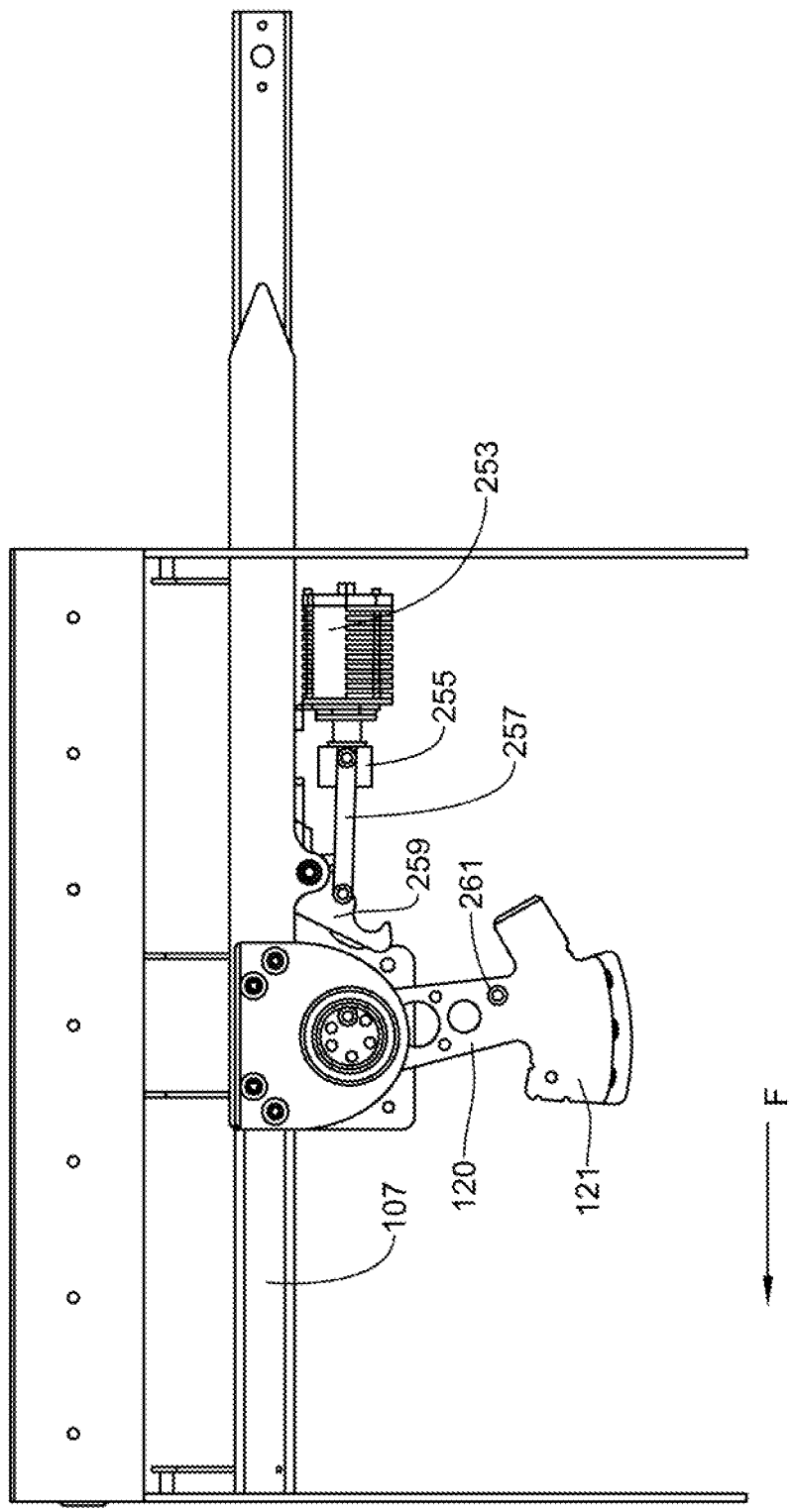
FIG. 22 is a plan view of the aerodynamic brake assembly of FIG. 20, with weighted arm in partial deployment.

FIGS. 20-22 show another embodiment of an aerodynamic brake assembly 250, with FIG. 20 showing a perspective view of the brake assembly 250, FIG. 21 showing a plan view of weighted arm assembly 120/121 in a retracted position, and FIG. 22 showing a plan view of weighted arm assembly 120/121 in a partially deployed position. In this case, the solenoid 253 is located on the same side of spar 107 as the weighted arm assembly 120/121. As shown in FIG. 22, interruption of power to solenoid 253, or the action of a threshold centrifugal force F acting on solenoid weight 255 causes distal movement of solenoid link arm 257 and pivotally connected latch 259. Movement of latch 259 away from a mating latch member 261 on arm weight 121 releases arm weight 121 to move in the direction of force F.

In a wind turbine rotor assembly, it may be desirable to have the brake assemblies of all blades or airfoils deploy whenever the brake assembly of any one of them deploys. Preferably, any electrical interruption to a braking assembly solenoid or electromagnet in one rotor blade should trigger the deployment of the weighted arm assemblies of every other rotor blade in the group. This can be accomplished electrically by placing the centrifugal force switches of the braking assemblies in series with one another, so that power to all assemblies is terminated when one of the switches opens. In another aspect, each brake assembly can also incorporate a weighted arm motion detection switch, which can interrupt the power flowing through the circuit if the arm weight 121 or 221 were to lose mechanical contact with its associated solenoid 113 or electromagnet 213. The circuit path can either include an electrical contact between arm weight 121 and pawl 116, or between arm weight 221 and electromagnet 213, or it can include a proximity switch built into the circuit such as, e.g., a magnetic proximity switch) that can be triggered upon movement of weighted arm assembly 120/121 or 220/221 away from its fully retracted position.

Figure 23:
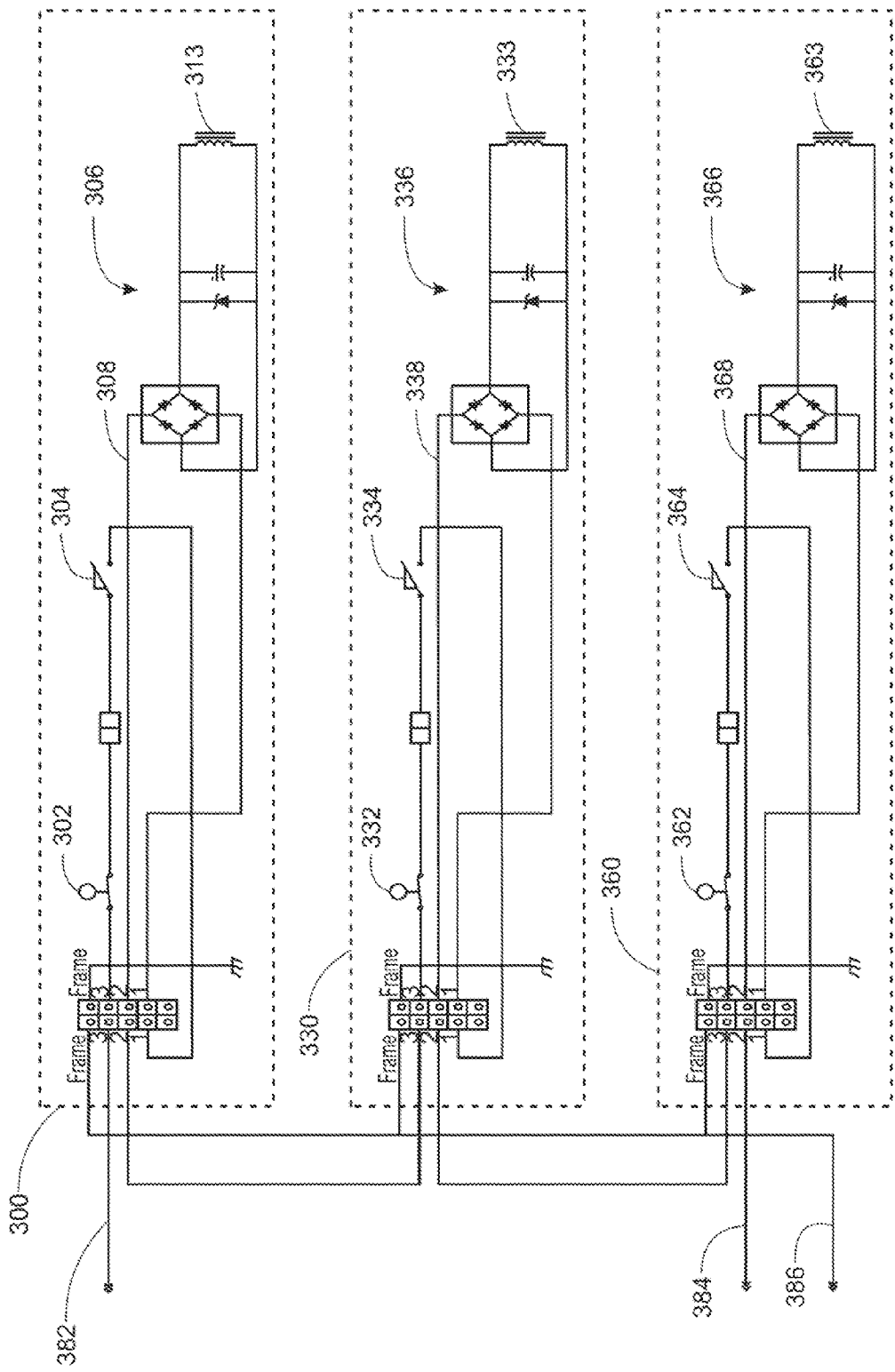
FIG. 23 is an exemplary wiring diagram for the aerodynamic brake assemblies of a three-blade rotor.

An example of an electrical circuit for a wind turbine rotor brake assembly is shown in FIG. 23. In this case, there are three interconnected circuits 300, 330 and 360, each supplying power to an individual rotor blade brake assembly solenoid or electromagnet 313, 333 and 363. Power is sourced from the hub of the rotor via, for example, a slip ring connector providing connections for power source 382, power return 384 and ground 386. In this case, each brake assembly includes a centrifugal force switch 302, 332 and 362, and a separate proximity switch (e.g. magnetic proximity switch) 304, 334, and 364. A magnetic proximity switch can be mounted, for example on the spar 107 next to the retracted arm weight 221, which can incorporate a magnet proximate to the switch sensor. (Sensing of the mechanical deployment of a weighted arm assembly can be important, for example, should there be a failure of one of the electromagnets or solenoids, or if corrosion, dirt or ice accumulation interferes with a proper contact between an individual arm weight and its associated electromagnet). For each rotor blade brake assembly, power flows in series through the centrifugal force switch and the proximity switch before reaching a DC bridge rectifier circuit 306, 336 or 366 to supply DC power respectively to an electromagnet or solenoid 313, 333 or 363. In addition, the brake assembly circuits 300, 330 and 360 are connected in series with one another via pathways 308, 338 and 368, so that power interruption from any one of switches 302, 304, 332, 334, 362, and 364 will interrupt power to all electromagnets or solenoids 313, 333 and 363. Thus, in a rotor assembly in which each of the rotor blades is equipped with a brake assembly, the release and deployment of any one weighted arm assembly can simultaneously trigger release of all weighted arm assemblies, resulting in a coordinated deployment of all spoiler plates on the rotor.

Figure 24:
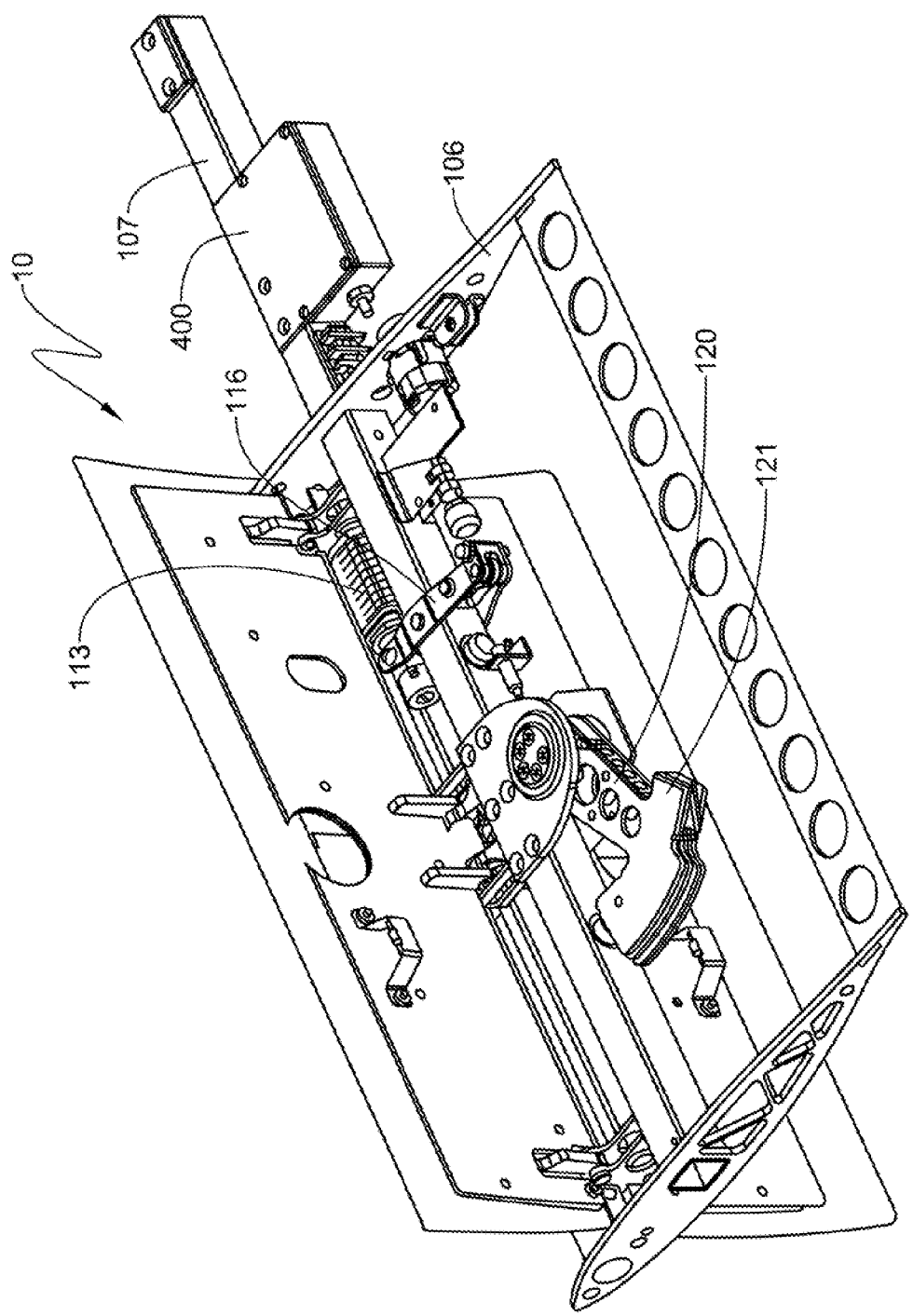
FIG. 24 is a perspective view of an aerodynamic brake assembly, including a centrifugal force actuated switch assembly.
Figure 25:
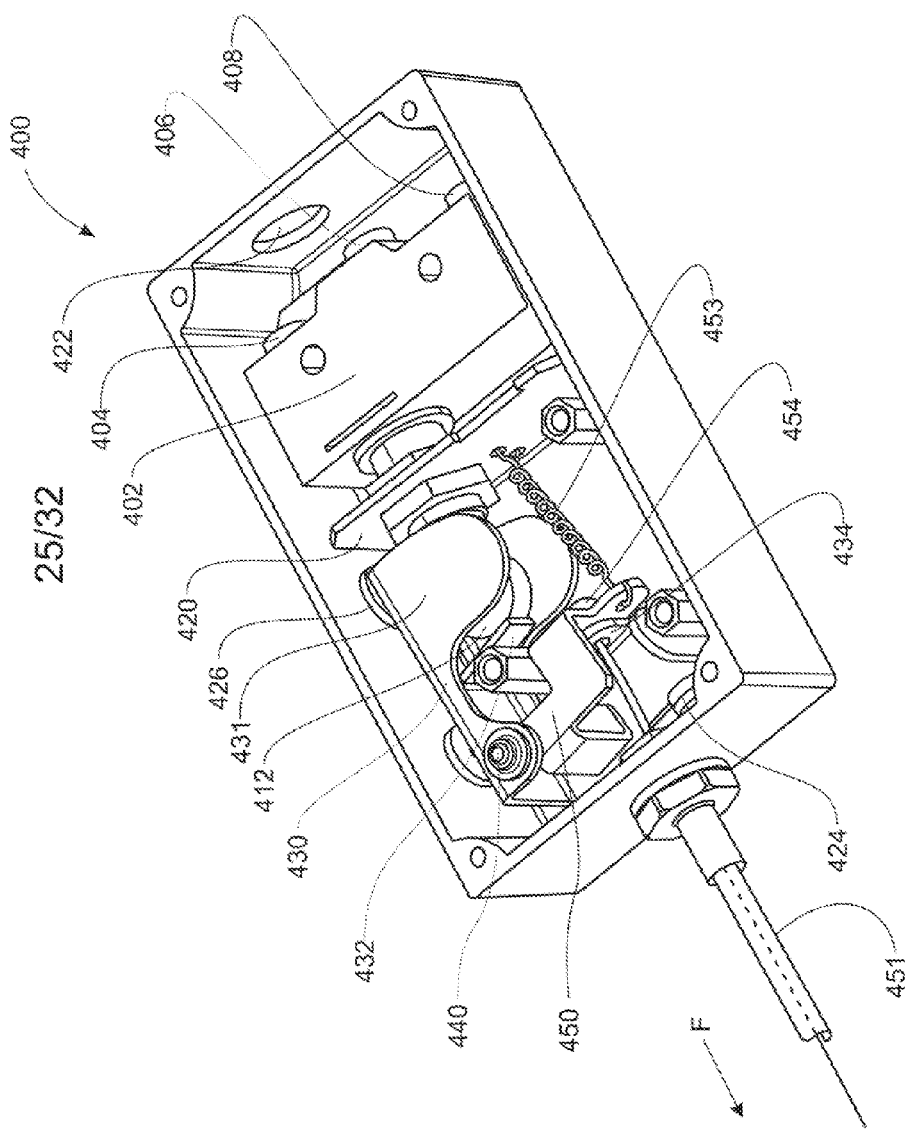
FIG. 25 is a perspective view of a centrifugal force actuated switch assembly.
Figure 26:
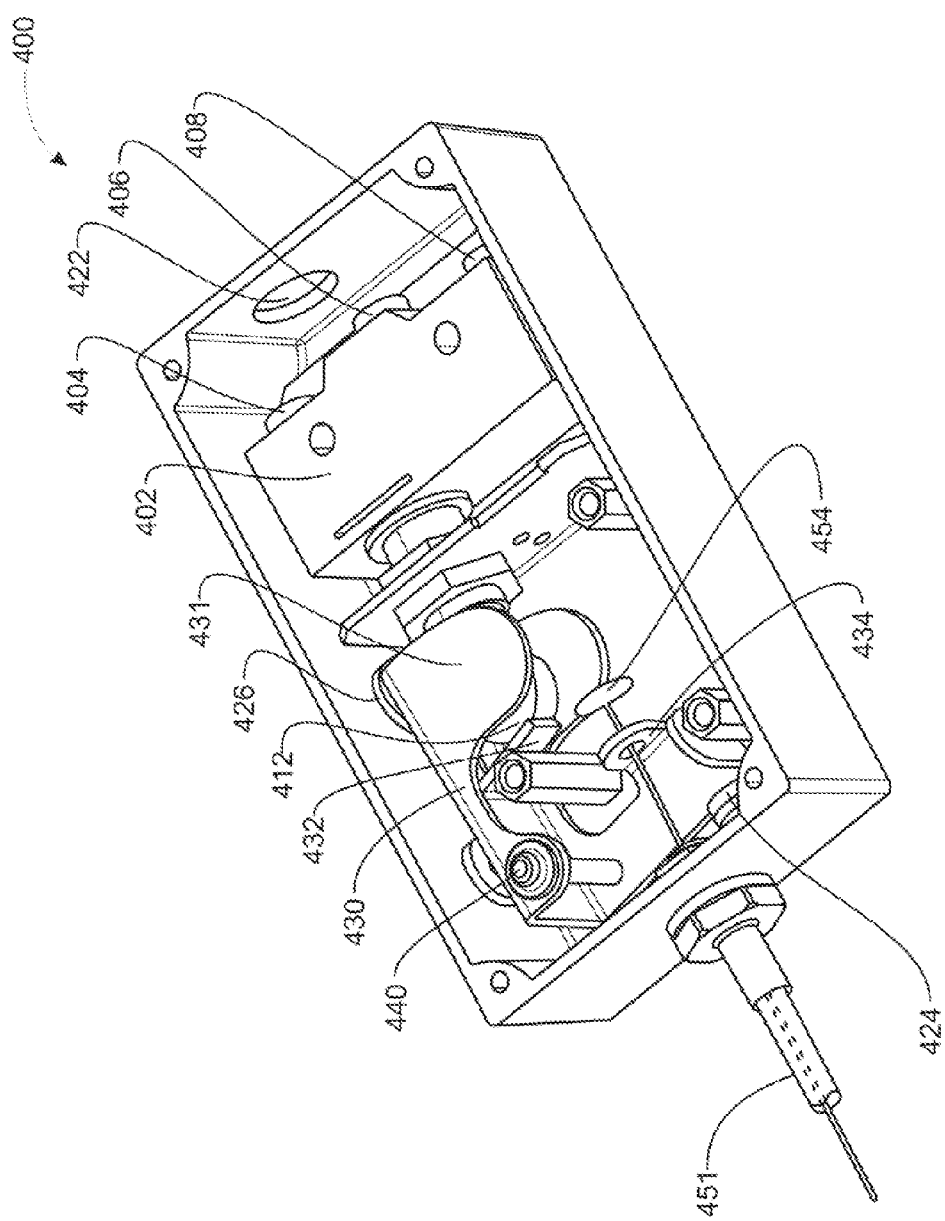
FIG. 26 is a perspective view of the centrifugal force actuated switch assembly of FIG. 25, with cable anchor removed.
Figure 29:
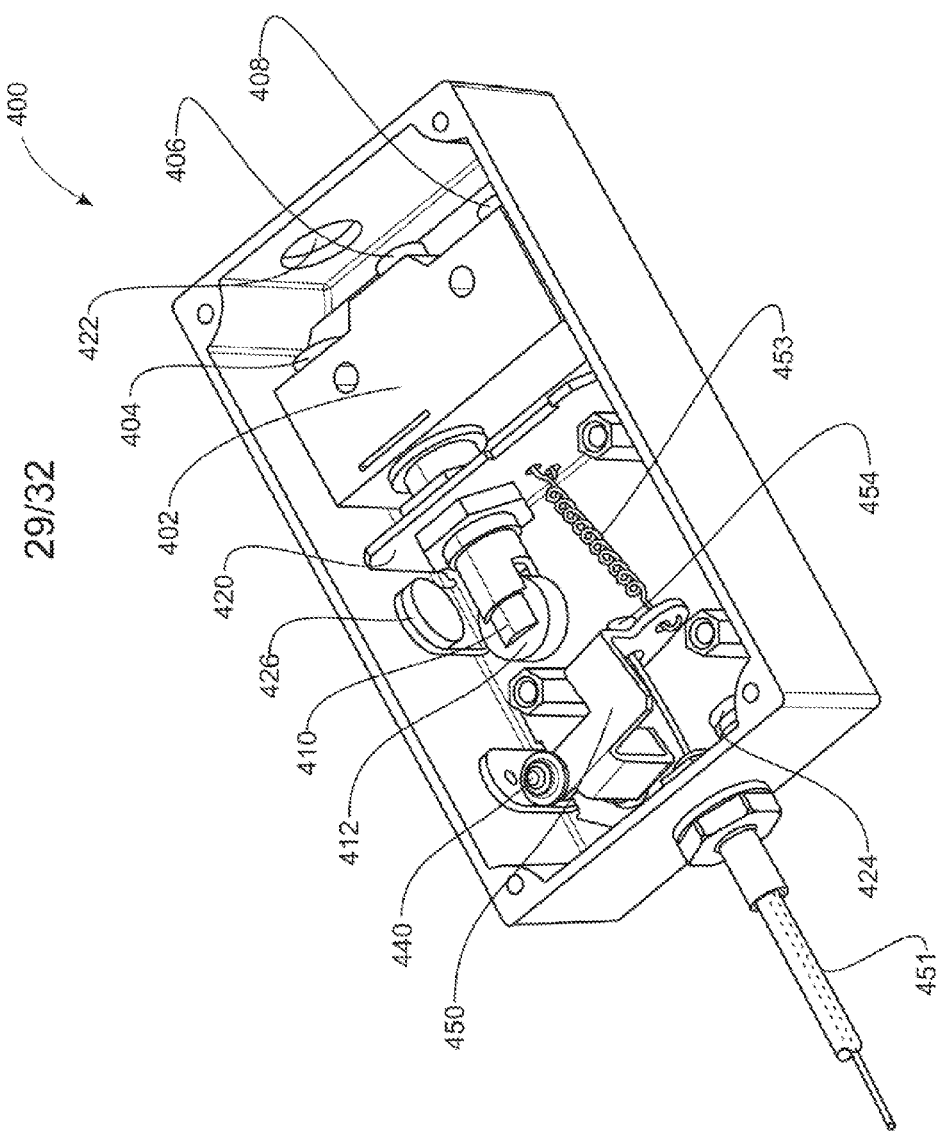
FIG. 29 is a perspective view of the centrifugal force actuated switch assembly of FIG. 25, with switch actuator removed.

In another embodiment, the aerodynamic brake assembly can be equipped with a single power interruption switch that can be actuated by a mechanical dual mode actuating assembly. The dual mode function allows the switch to be actuated either by a centrifugal force actuator or by a linkage that can respond to movement of the weighted arm assembly 120/121 or 220/221. An exemplary dual mode actuating assembly 400 is shown in FIG. 24, which in this case is attached to spar 107 outside rib 106 of airfoil section 10. FIG. 25 shows the actuating assembly 400 with cover removed. A spring loaded plunger switch 402 is secured to an internal frame member 420. A weighted switch actuator 430 can actuate switch 402 via contact element or tab 432. FIG. 29, in which weighted switch actuator 430 has been removed, shows the spring loaded plunger 410 more clearly, which optionally may have a roller bearing contact element 412 to make contact with actuator tab 432. Electrical terminals 404, 406 and 408 of switch 402 are accessible to wires via access cutout 422. Weighted switch actuator 430 includes an actuator weight 431 that can cause switch actuator 430 to respond to a centrifugal force acting on the assembly 400. Weighted switch actuator 430 can be constructed of any suitable material (e.g., steel) that provides sufficient structural strength to withstand reciprocating movement against stop elements 424 and 426, and has sufficient mass to respond to the centrifugal force associated with the overspeed threshold of the rotor blade. Weighted switch actuator 430 can be seem more clearly in FIG. 26, in which pivoting cable anchor 450 has been removed. The weighted component 431 is of a mass and geometry that causes pivotal movement of switch actuator 430 about axis 440 when the rotor blade to which actuating assembly 400 is attached reaches maximum permissible rotational speed.

Figure 27:
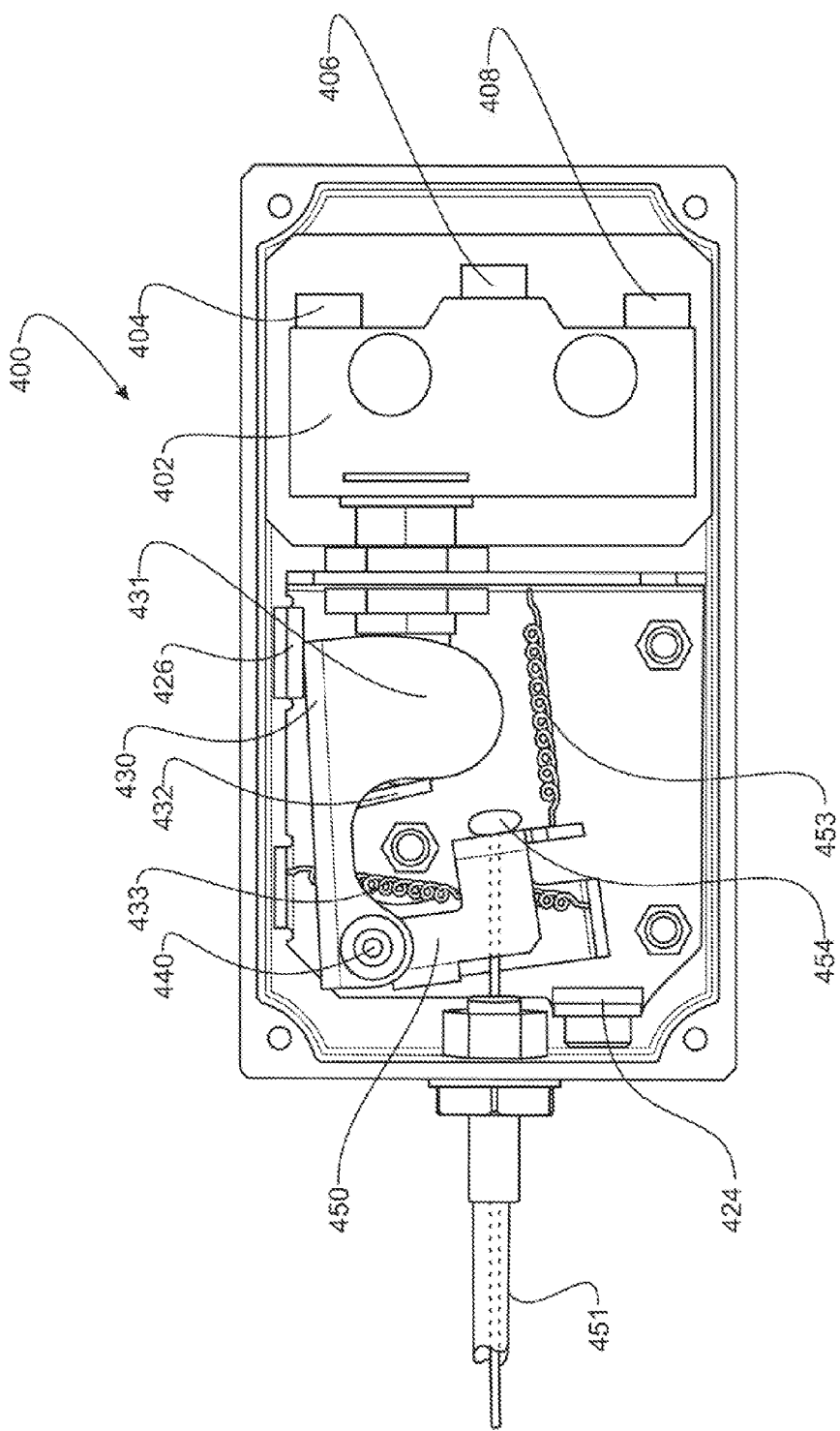
FIG. 27 is a plan view of the centrifugal force actuated switch assembly of FIG. 25.
Figure 28:
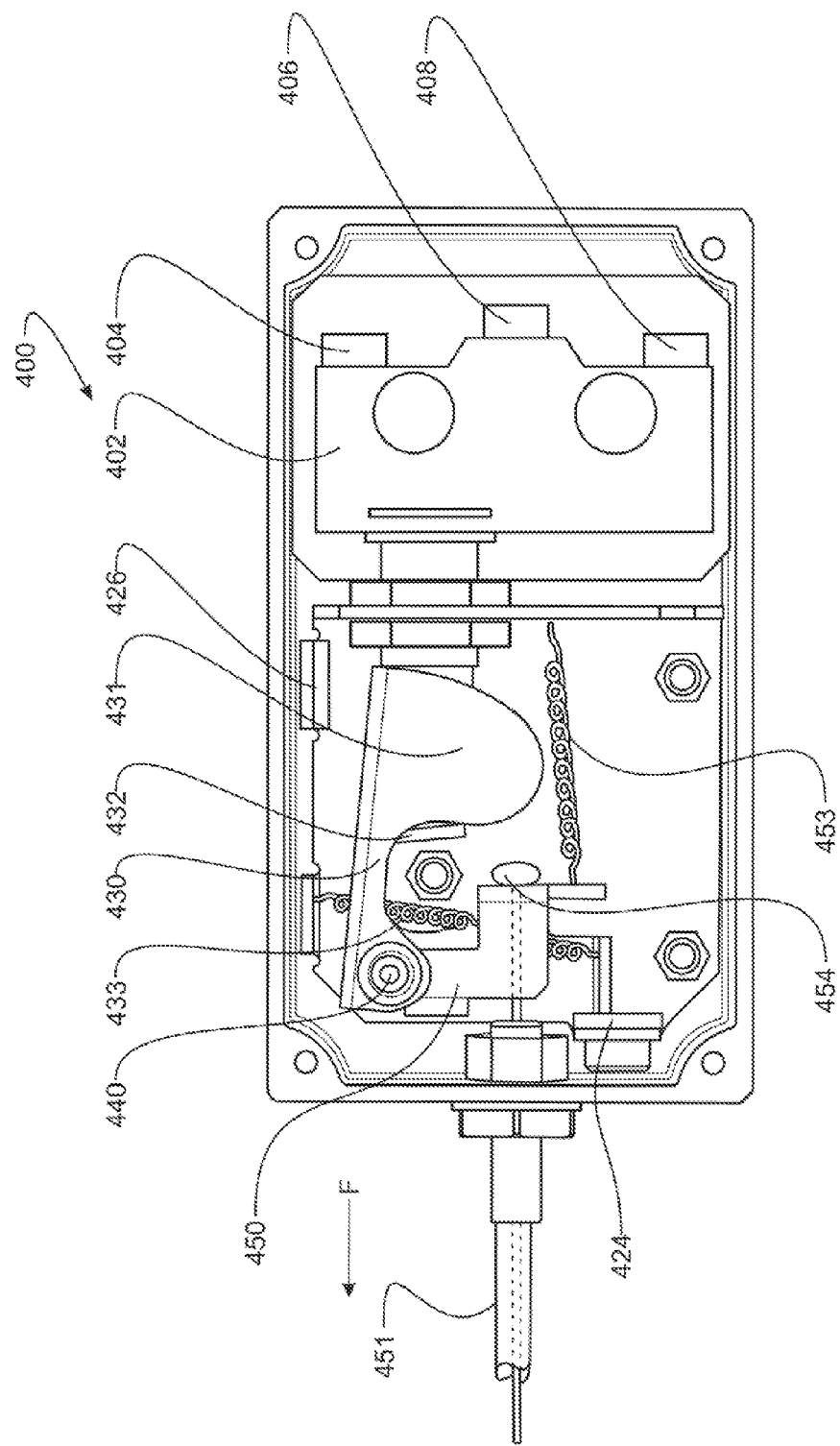
FIG. 28 is a pan view of the centrifugal force actuated switch assembly of FIG. 25.

As shown in FIG. 27, switch actuator spring 433 can urge weighted switch actuator 430 into a retracted position in the absence of a counteracting centrifugal force. Thus actuator tab 432 keeps switch 402 in closed configuration by pressing against switch contact element 412 and overcoming the spring loaded plunger 410. Maximum travel of switch actuator 430 against switch plunger 410 can be limited by stop element 426. As shown in FIG. 28, upon application of a centrifugal force F of sufficient magnitude, the force F acting on actuator weight 431 of actuator 430 can overcome the counteracting bias of spring 433 and move switch actuator 430 into a deployed position, limited by contact with stop element 424. Upon release of tab 432 from contact with the contact element 412 of spring plunger 410, switch 402 opens the electrical circuit to which it is connected.

Figure 30:
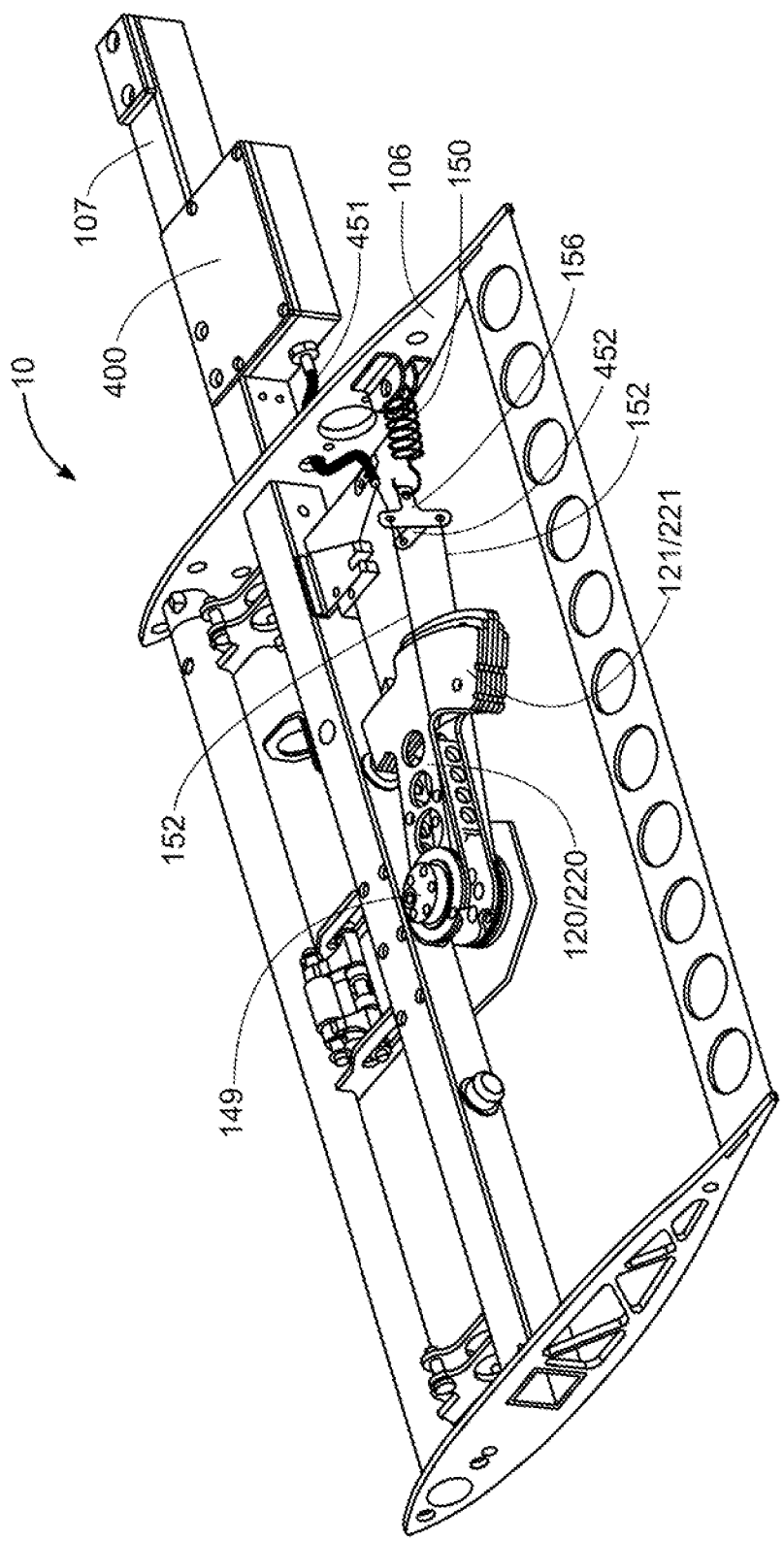
FIG. 30 is a perspective view of an aerodynamic brake assembly with the cable of a centrifugal force actuated switch assembly connected to the swing arm assembly.
Figure 31:
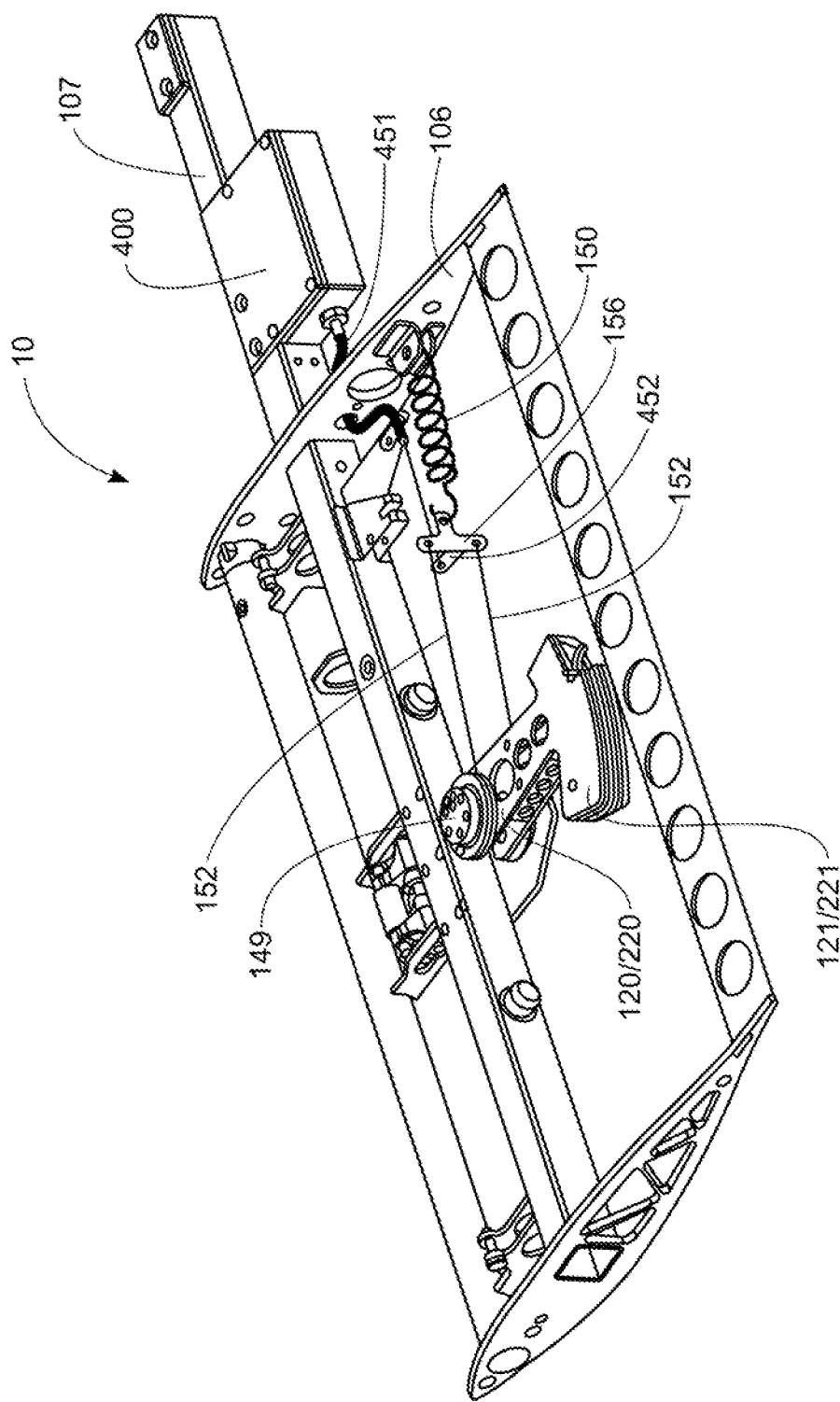
FIG. 31 is a perspective view of an aerodynamic brake assembly with the cable of a centrifugal force actuated switch assembly connected to the swing arm assembly, with weighted swing arm partially deployed.
Figure 32:
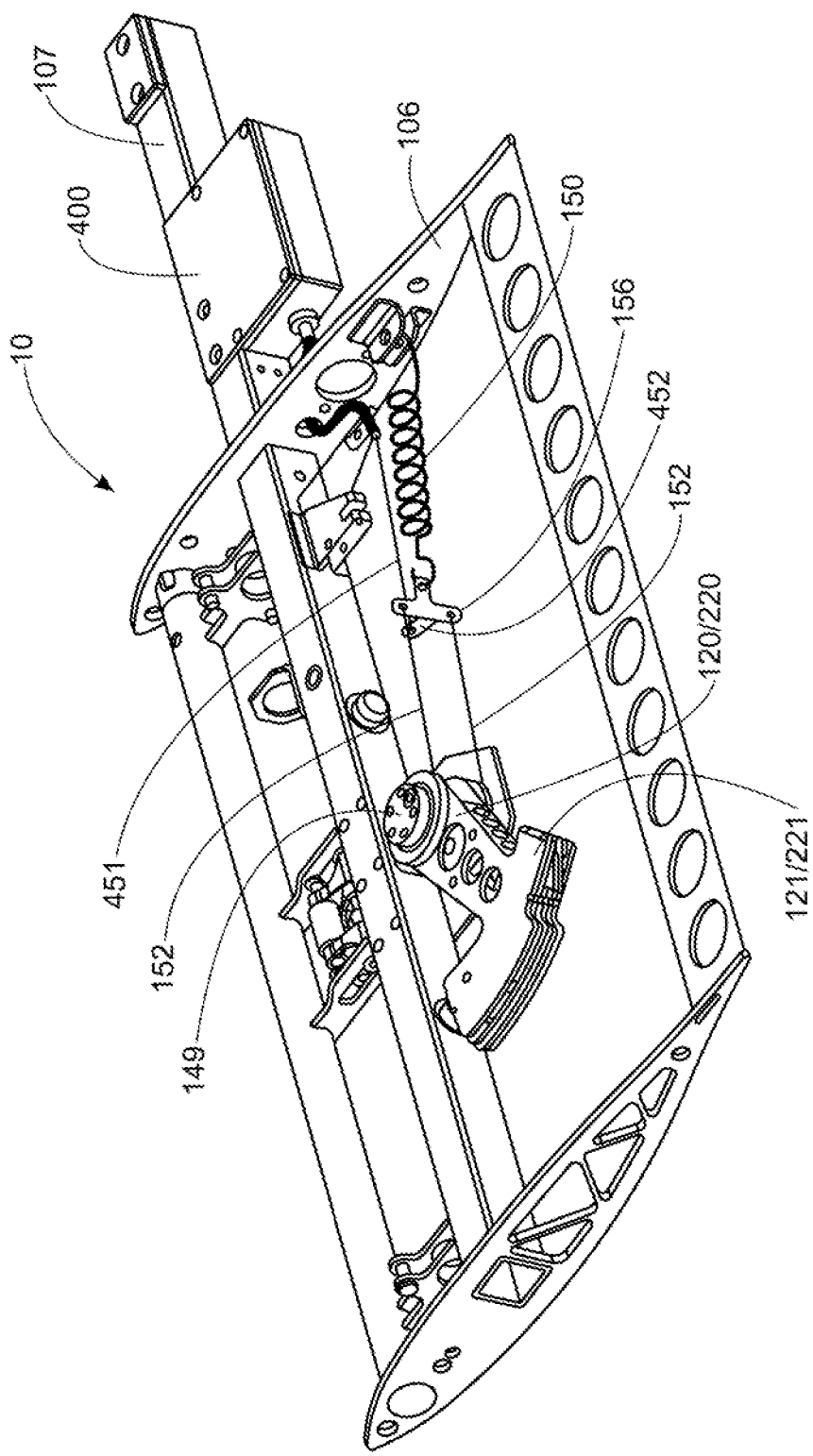
FIG. 32 is a perspective view of an aerodynamic brake assembly with the cable of a centrifugal force actuated switch assembly connected to the swing arm assembly, with weighted swing arm fully deployed.

Actuating assembly 400 can be independently operated by the physical movement of weighted arm assembly 120/121 or 220/221 from its retracted position. As shown in FIG. 30, in one embodiment, a sheathed cable 451 can connect return cables 152 of weighted arm assembly 120/121 or 220/221 via spring bridle 156 with pivoting cable anchor 450 (FIG. 25) and switch actuator cable stop 434 of actuating assembly 400 (FIG. 25). As shown in FIG. 30, a cable harness 452 can be used to connect cable 451 to return spring bridle 156. Thus, as shown in FIGS. 31 and 32, as weighted arm assembly 120/121 or 220/221 moves from its retracted position to its deployed position, return spring 150 and spring bridle 156 are pulled distally, thereby pulling cable 451 by a length sufficient to pull switch actuator 430 (see FIG. 28) away from spring plunger contact element 412 (see FIG. 25), and allowing switch 402 to open the circuit to which it is connected. As shown in FIG. 25, movement of cable in the direction of F, causes cable end cap 454 to pull against pivoting cable anchor 450 and switch actuator 430 via switch actuator cable stop 434. In an embodiment, both pivoting cable anchor 450 and switch actuator 430 can optionally pivot about a common axis 440. The spring rate of cable return spring 453 can be chosen to be capable of urging pivoting cable anchor 450 and cable 451 to a retracted position once the weighted arm assembly has returned to its retracted position. The independently pivotable cable anchor 450 and switch actuator 430 allow cable anchor 450 to be retracted away from contact with switch actuator cable stop 434, allowing switch actuator spring 433 to retract switch actuator 430, closing switch 402. Because switch actuator 430 and cable anchor 450 can pivot independently from one another, switch plunger 410 can actuate switch 402 into an open position either by centrifugal force being applied to switch actuator weight 431, or by distal movement of cable 451 acting against cable anchor 450 and switch actuator cable stop 434.

In another aspect, cable 451 can be connected to other components of weighted arm assembly 120/121 or 220/221 in order to effect movement of switch actuator 430 away from plunger 410 of switch 402. For example, cable 451 can be attached near the axis 149 of weighted arm assembly 120/121 or 220/221. The distance between the point of attachment of the end of cable 451 and the axis 149 determines the degree of linear translation of cable 451, and can be made to match the movement required to actuate switch 402 via switch actuator 430. In a further embodiment a coil spring can be interposed between the end of cable 451 and its attachment to either the hub of weighted arm assembly 120/121 or 220/221 or to return spring bridle 156 in order to take up any linear translation of cable 451 that exceeds the amount required to actuate switch 402 via movement of switch actuator 430.

Ice formation on airfoil structures can be a serious problem in harsh weather climates. For example, formation of ice on an airfoil may degrade the performance and/or efficiency of electricity generation, create an imbalance and thereby damage the turbine, or even endanger persons in close proximity to the turbine if ice breaks free at high turbine speeds. A properly functioning aerodynamic brake assembly is all the more important under these circumstances. Thus, in a preferred embodiment, the aerodynamic brake assembly 100 or 200 may incorporate a means of detecting and mitigating ice formation.

For example, an air temperature sensor may initially be used to determine whether ice formation is probable, i.e., a temperature at or near freezing. If a sufficiently low temperature is detected, an apparatus capable of acoustically detecting ice may "ping" a portion of the airfoil section 10 or aerodynamic brake assembly 100 with low and/or high frequency signals to determine whether the targeted structure resonates at frequency signifying ice formation. In one embodiment, an electromagnetic pulse generator can transmit mechanical pulses through a transducer applied to the inside surface of the airfoil. The mechanical forces generated against the surface are sufficient to create vibrational movement of the surface. The vibrations can be detected by an accelerometer placed on the inside surface of the airfoil a suitable distance from the transducer. The vibrations are converted to an electrical signal, which can then be sent to a PLC, whereupon the voltage of the signal can be compared to a set of reference values stored in memory. The reference values can be obtained from a series of measurements taken of the particular airfoil both with and without the presence of a coating of ice of specified thickness on its external surface.

Such an apparatus may be in communication with a PLC controlling deployment operations. Thus, a PLC may cut off power to solenoid 113 to deploy the upper and lower spoiler plates 101 and 102 upon detection of ice formation. Alternatively, a PLC may be connected to one or more electrically resistive heating elements incorporated into or attached to the inner or outer surface of the airfoil. The heating elements can be constructed of, for example, metal wire or carbon-based fibers, depending on the mechanical stresses that the airfoil is likely to sustain, and the weight limitations in the design of the airfoil.

In another aspect, the cavity 20 encompassing deployment mechanism 112 can be protected from the environment when the spoiler plates are deployed by a membrane (made of, for example, sheet metal, fiberglass, plastic or other synthetic material, either flexible or rigid). The membrane preferably can be recessed sufficiently with respect to the airfoil profile to allow the un-deployed or retracted spoiler plates to maintain an aerodynamic profile that approximately conforms to the adjacent airfoil. Although cutouts on the membrane are needed for the spoiler plate hinges and deployment linkages, most of cavity 20 and the enclosed brake assembly components can be shielded from the weather, increasing the maintenance-free intervals for the device.

The invention claimed is:

1. A braking assembly for an airfoil, the airfoil configured to rotate about a hub, comprising:
   a first plate and an opposing second plate, the plates having outside surfaces, opposing inside surfaces, and each having a forward portion with a leading edge and an aft portion with a trailing edge; and
   a linkage assembly between the first and second plates, the linkage assembly hingedly interconnecting the forward portions of the inside surfaces of the first and second plates to a first end of an elongate driving member configured to move fore and aft;
   wherein the inside surface of the forward portion of each plate is hingedly connected to a frame, allowing the aft portions of the plates to pivot away from or retract toward each other;
   wherein forward movement of the driving member toward the leading edges of the plates causes the aft portions of the plates to retract toward each other, and aft movement of the driving member away from the leading edges of the plates causes the aft potions of the plates to pivot away from each other;
   and wherein said frame is attachable to a section of the airfoil such that the outside surfaces of the plates when retracted conform approximately to the contour of a section of the airfoil to which the braking assembly can be attached.

2. The braking assembly of claim 1 wherein
   the frame comprises an elongate spar having a long axis bounded by a proximal end and a distal end, situated in a space bounded by the inside surfaces of the retracted plates, the long axis of the spar oriented approximately perpendicular to the forward to aft direction of the plates; and
   the braking assembly further comprising:
   a weighted member having:
   a first pivotal connection to the spar, said first pivotal connection having an axis of rotation approximately perpendicular to the surfaces of the retracted plates,
   a second pivotal connection to a second end of the driving member, the axis of rotation of said second pivotal connection being approximately parallel to and non-coincident with the axis of the first pivotal connection, wherein rotation of the weighted member about the first pivotal connection causes a fore or aft movement of the driving member.

3. The braking assembly of claim 2 wherein the weighted member has a center of mass that is non-coincident with the axis of the first pivotal connection of the weighted member to the spar, such that a centrifugal force acting generally from the proximal end toward the distal end of the spar can cause rotation of the weighted member about the first pivotal connection.

4. The braking assembly of claim 3, wherein the weighted member comprises an elongate arm wherein the first pivotal connection is located near a first end of the arm, and a second end of the arm comprises an arm weight, the arm weight having a latching feature.

5. The braking assembly of claim 4, wherein the latching feature can reversibly couple with a latch connected to a plunger of a solenoid secured to the frame when the arm weight is in a retracted position proximal to the first pivotal connection of the arm.

6. The braking assembly of claim 5, wherein electrical activation of the solenoid places the latch in a position to couple with the arm weight.

7. The braking assembly of claim 6, wherein the solenoid plunger further comprises a plunger weight, said plunger weight selected to overcome the electromagnetic pull on the plunger by the solenoid upon the application of a pre-determined amount of centrifugal force acting on the plunger weight.

8. The braking assembly of claim 6, further comprising an electronic controller, said controller configured to receive a signal representing the rotational speed of the airfoil, and configured to interrupt electrical power to the solenoid upon the airfoil reaching a pre-determined rotational speed.

9. The braking assembly of claim 6, further comprising an electrical switch responsive to a pre-determined centrifugal force, said switch capable of interrupting electrical power to the solenoid in response to said centrifugal force.

10. The braking assembly of claim 9, further comprising a mechanism for operating the electrical switch comprising:
   a weighted actuator pivotally connected to the frame and capable of rotating into and out of contact with the switch, and
   a spring connecting the weighted actuator to the frame and applying a biasing force to urge the weighted actuator into contact with the switch, wherein
   the weighted actuator has a center of mass that is non-coincident with the axis of rotation of the weighted actuator, such that application of a pre-determined centrifugal force on the weighted actuator overcomes the biasing force of the spring to reduce the contact force of the weighted actuator against the switch.

11. The braking assembly of claim 10, further comprising:
   a cable connecting the weighted member to an anchor pivotally connected to the frame, wherein a pre-determined degree of travel by the weighted member causes the cable to move the anchor into contact with the weighted actuator and overcome the biasing force of the spring to reduce the contact force of the weighted actuator against the switch.

12. The braking assembly of claim 4, wherein the ferromagnetic component can magnetically immobilize the weight next to a pole of an electromagnet secured to the frame when the arm weight is in a retracted position proximal to the first pivotal connection of the arm.

13. The braking assembly of claim 12, wherein the electromagnet is selected to produce an electrically induced magnetic force attracting the ferromagnetic component of the arm weight that can be overcome by a pre-determined amount of centrifugal force acting on the arm weight.

14. The braking assembly of claim 12, further comprising an electronic controller, said controller configured to receive a signal representing the rotational speed of the airfoil, and configured to interrupt electrical power to the electromagnet upon the airfoil reaching a pre-determined rotational speed.

15. The braking assembly of claim 12, further comprising an electrical switch responsive to a pre-determined centrifugal force, said switch capable of interrupting electrical power to the electromagnet in response to said centrifugal force.

16. The braking assembly of claim 15, further comprising a mechanism for operating the electrical switch comprising:
   a weighted actuator pivotally connected to the frame and capable of rotating into and out of contact with the switch, and
   a spring connecting the weighted actuator to the frame and applying a biasing force to urge the weighted actuator to contact the switch, wherein
   the center of mass of the weighted actuator is non-coincident with the axis of rotation of the weighted actuator, such that application of a pre-determined centrifugal force on the weighted actuator overcomes the biasing force of the spring to reduce the contact force of the weighted actuator against the switch.

17. The braking assembly of claim 16, further comprising:
   a cable connecting the weighted member to an anchor pivotally connected to the frame, wherein a pre-determined degree of travel by the weighted member causes the cable to move the anchor into contact with the weighted actuator and overcome the biasing force of the spring to reduce the contact force of the weighted actuator against the switch.

18. The braking assembly of claim 1 wherein:
   the frame comprises an elongate spar connecting a first rib to a second rib, the spar being approximately perpendicular to the first and second ribs, and wherein
   each rib is oriented to have a forward leading edge, an aft trailing edge and an upper and lower surface defining a contour approximately conforming to the forward to aft contour of the section of the airfoil to which the braking assembly can be attached.

19. A braking assembly for an airfoil, the airfoil configured to rotate about a hub, comprising:
   a) a plate having an outside surface, inside surface, and having a forward portion with a leading edge and an aft portion with a trailing edge;
      the inside surface of the forward portion of the plate being hingedly connected to a frame, allowing the aft portion of the plate to pivot away from or retract toward the frame;
      said frame being attachable to a section of the airfoil such that the outside surface of the plate when retracted conforms approximately to the contour of a section of the airfoil to which the braking assembly can be attached;
   b) a linkage assembly hingedly interconnecting the inside surface of the forward portion of the plate to a first end of an elongate driving member configured to move fore and aft; wherein
      forward movement of the driving member toward the leading edge of the plate causes the aft portion of the plate to retract toward the frame, and aft movement of the driving member away from the leading edge of the plate causes the aft portion of the plate to pivot away from the frame; and
   c) a weighted member having:
      a first pivotal connection to the frame, said first pivotal connection having an axis of rotation approximately perpendicular to the surface of the retracted plate, and
      a second pivotal connection to a second end of the driving member, the axis of rotation of said second pivotal connection being approximately parallel to and non-coincident with the axis of the first pivotal connection, wherein
   rotation of the weighted member about the first pivotal connection causes a fore or aft movement of the driving member, and retraction or deployment of the plate.

20. An assembly for operating an electrical switch attached to a frame comprising:
   a weighted actuator pivotally connected to the frame and capable of rotating into and out of contact with the switch,
   a spring connecting the weighted actuator to the frame and applying a biasing force to urge the weighted actuator to contact the switch, and
   a cable connected to an anchor pivotally connected to the frame
   wherein
   the weighted actuator has a center of mass that is non-coincident with the axis of rotation of the weighted actuator, such that application of a pre-determined centrifugal force on the weighted actuator overcomes the biasing force of the spring to reduce the contact force of the weighted actuator against the switch, and wherein
   a pre-determined pulling force by the cable against the anchor can cause the anchor to apply a force against the weighted actuator and overcome the biasing force of the spring to reduce the contact force of the weighted actuator against the switch.

* * * * *